(12) United States Patent
Aflalo et al.

(10) Patent No.: US 11,643,275 B1
(45) Date of Patent: May 9, 2023

(54) APPARATUS FOR A DISPATCH AND DELIVERY SYSTEM

(71) Applicant: Todoo Ltd., Rehovot (IL)

(72) Inventors: Oren Aflalo, Rehovot (IL); Igal Aflalo, Rehovot (IL)

(73) Assignee: Todoo Ltd., Rehovot (IL)

( * ) Notice: Subject to any disclaimer, the term of this patent is extended or adjusted under 35 U.S.C. 154(b) by 0 days.

(21) Appl. No.: 17/901,017

(22) Filed: Sep. 1, 2022

(51) Int. Cl.
| | | |
|---|---|---|
| *B64F 1/32* | (2006.01) | |
| *B65G 17/00* | (2006.01) | |
| *B64C 39/02* | (2023.01) | |
| *G06K 7/14* | (2006.01) | |
| *B64F 1/36* | (2017.01) | |
| *G05D 1/10* | (2006.01) | |
| *B64U 50/19* | (2023.01) | |
| *B64U 101/60* | (2023.01) | |

(52) U.S. Cl.
CPC .......... *B65G 17/005* (2013.01); *B64C 39/024* (2013.01); *B64F 1/32* (2013.01); *B64F 1/362* (2013.01); *G06K 7/1413* (2013.01); *B64U 50/19* (2023.01); *B64U 2101/60* (2023.01); *G05D 1/101* (2013.01)

(58) Field of Classification Search
CPC .............. B65G 17/005; B64U 2101/64; B64U 2101/60; B64C 39/024; B64F 1/32
See application file for complete search history.

(56) References Cited

U.S. PATENT DOCUMENTS

| | | | | |
|---|---|---|---|---|
| 9,527,605 | B1* | 12/2016 | Gentry | B65G 51/02 |
| 10,946,982 | B2* | 3/2021 | Carthew | B64F 1/32 |
| 10,993,569 | B2* | 5/2021 | Gil | A47G 29/22 |
| 11,066,186 | B2* | 7/2021 | Walsh | G06Q 10/1097 |
| 2019/0135433 | A1* | 5/2019 | Goovaerts | B64F 1/14 |
| 2019/0233135 | A1* | 8/2019 | Cantrell | B64F 1/005 |
| 2019/0300202 | A1* | 10/2019 | High | B64F 1/368 |
| 2020/0056739 | A1* | 2/2020 | Strahlendorf | F16M 11/24 |
| 2021/0309363 | A1* | 10/2021 | Zhou | B64C 39/024 |
| 2022/0356019 | A1* | 11/2022 | Teoli | B65G 11/123 |

\* cited by examiner

*Primary Examiner* — Kaitlin S Joerger
(74) *Attorney, Agent, or Firm* — The Roy Gross Law Firm, LLC; Roy Gross

(57) ABSTRACT

A package unloading and conveying system including a landing platform and one or more container aligning linear rails. The container aligning linear rails for aligning, on or above the landing platform and a hold of an aerial vehicle placed in front of one of multiple conveyor belts. One or more package extracting tools adapted to push or pull the package out of the aligned hold into a container aligned with one of the multiple conveyor belts. The multiple rail arrangements each adapted to convey the container to one of the multiple building windows from one of the multiple conveyors.

16 Claims, 14 Drawing Sheets

APPARATUS FOR A DISPATCH AND DELIVERY SYSTEM

RELATED APPLICATION(S)

This application claims the benefit of priority of Israel Patent Application No. 296121 filed on Aug. 31, 2022, the contents of which are incorporated by reference as if fully set forth herein in their entirety.

FIELD AND BACKGROUND OF THE INVENTION

The present disclosure, in some embodiments thereof, relates to provide an apparatus, a system, a computer program product, and a method for a delivery system that includes a landing pad and, more specifically to mechanisms to load and unload shipments from an aerial vehicle, but not exclusively to aerial vehicles. Many businesses believe that drone delivery is a more cost-effective means of delivering packages, carry-out food, and other purchases. Instead of sending a single delivery driver to drop off packages at 25 different homes, 25 separate drones may simultaneously transport the items to the places where they need to go. Packages may be delivered all at once instead of one-by-one. Drone delivery may be a much faster and far more efficient method of delivery, allowing some items to be dropped off within an hour of being purchased.

SUMMARY OF THE INVENTION

It is an object of the present invention to provide an apparatus, a system, a computer program product, and a method for a delivery system that includes a landing pad and, more specifically to mechanisms to load and unload shipments from an aerial vehicle, but not exclusively to aerial vehicles.

A package unloading and conveying system including a landing platform and one or more container aligning linear rails. The container aligning linear rails for aligning, on or above the landing platform and a hold of an aerial vehicle placed in front of one of multiple conveyor belts. One or more package extracting tools adapted to push or pull the package out of the aligned hold into a container aligned with one of the multiple conveyor belts. The multiple rail arrangements each adapted to convey the container to one of the multiple building windows from one of the multiple conveyors.

The container may include a handle attached to the container and a rail of the multiple rail arrangements. The handle utilized to maintain the balance of the container on its way along the rail to the landing platform. A volume sensor, a transmitter and a rechargeable battery located inside the container. The bottom of the container includes two electrical terminals to supply DC power to the volume sensor, the transmitter and the rechargeable battery. A removable drawer including rails, where at a delivery location the drawer is pulled out to insert or remove a shipment packed in a package from the container. A door configured to open as soon as the container has reached a point of proximity to the conveyor belt for an actuator to push a lever of a door mechanism of the container that opens the door. A slider that attaches to the handle is moveably attached between a first wheel and a second wheel of the rail to enable movement of the container from a second end to a first end of the rail.

A mechanism operatively attached to the rail includes a first track and a second track that are round in cross section. A cable connected to the container on one side and on the other side of the container an electric motor. The electric motor includes a sensor configured to count the respective number of rotations of the electric motor to indicate where the container is at any given moment. The cable enters through a hollow portion of the first track and returns on a first wheel and a second wheel back to the fourth electric motor. Two springs are attached to the first and second tracks located at the second end, the two springs designed to stop the container from falling in the event of a failure of the cable. Two plastic guides located on the first or second track at the first end to prevent the container curling during loading and unloading of the shipment to and from a channel of a conveyer respectively.

A package loading and conveying system including a landing platform, one or more package aligning linear rails, for aligning, on or above the landing platform, a hold of an aerial vehicle in front of one of multiple conveyor belts. A package insertion tool adapted to push a delivery object to one of the multiple conveyor belts into the aligned hold. Multiple rail arrangements operatively attached at first ends to the respective fronts of the multiple conveyor belts. Each of the multiple rail arrangements are adapted to convey multiple containers that contain respective multiple packages, to the backs of the multiple conveyer belts or away from the backs of the multiple conveyer belts to second ends of the multiple rail arrangements.

The package insertion tool may further include an actuator attached to a hook. The hook may be operably attached to the mechanism and further engaged to a locking actuator. The locking actuator is moved back and forth along the linear rail between two pulleys rotatably attached to a motor. The control of the rotational direction of the motor to enable both a loading and an unloading of a package onto or off the conveyor and, enables an insertion or removal of a package, to or from one container of the multiple containers. A conveyer attached to a second end of a rail of the multiple rail arrangements is driven by an electric motor that includes a sensor configured to count the revolutions of the electric motor that is rotatably attached to a belt of the conveyer that includes radially attached dividers. A linear slider movably attached between the rail and a handle of the container. The moveable attachment between the linear slider and the handle maintains the orientation of the container as the container travels back and forth on rail between the second end and the first end.

The package loading and conveying system may further include four cameras installed on a guardrail of the landing platform. Two of the four cameras may be utilized for barcode scanning of a barcode attached to a package. Two of the four cameras may be utilized to identify and control functional operations of the landing platform.

The package loading and conveying system may further include a pair of electrical bus bars attached to the one or more package aligning linear rail. A coming into contact with electrical terminals of the hold and the pair of electrical bus bars enables an electrical charging of the batteries of the aerial vehicle.

An aerial vehicle, including a hold having multiple doors each on a different edge of the hold. A door tilting mechanism having multiple levers each of the multiple levers is movable along a first direction along a perpendicular to the bottom of the hold when a distal end thereof is pressed against a landing platform. The door tilting mechanism having one or more spring adapted to pull each of the multiple levers opposite to the first direction when a respective distal end is not pressed against the landing platform.

The aerial vehicle may further include landing skids attached to the hold. The landing skids may be placed diagonally towards a footprint of a platform to allow stable unloading and loading of the shipment packed in a package from and to a channel of a conveyer. A volume sensor may be installed inside the hold. Four proximity sensors installed inside the container, the four proximity sensors utilized to confirm that the doors of the hold are closed. Four levers are operably attached to the hold doors. The four levers configured so that upon landing of the aerial vehicle on a footprint opens the four doors. At least four mechanisms including springs located on the door hinges of the four doors to ensure the closure of the four doors during takeoff of the aerial vehicle. Minus and plus electrical contacts for charging the aerial vehicle upon landing of the aerial vehicle on landing footprint. Four flaps each located on a different bottom edge of the hold, wherein each flap when pressed against the landing platform, provides four ramps to enable a loading and an unloading of a package to and from the hold respectively.

The landing platform is attached atop a building. The landing platform is operably connected to a first side of the conveyer. A first end of the rail is operably connected to a second side of the conveyer. A mechanism may be moveably attached to the rail at the first end and at a second end. The container attached to the mechanism, enables the container to move back and forth along the rail between the first end and the second end of the rail. The second end is at a specific location on the exterior of the building.

Upon receiving a shipment packed in a package on the landing platform. The delivery system is configurable to convey the package by a channel of the conveyer to a first end of the rail. An actuator and a hook is configurable to insert the package into the container and move the container to a second end of the rail. In sending a package to the landing platform, the delivery system is configurable to receive an insertion of a shipment packed in a package into container located at the second end and move the container from the second end to the first end. At the first end, the actuator and a hook are configurable to remove the package from the container onto a channel of the conveyer to convey the package to the footprint.

A method for a delivery system to deliver a shipment packed in a package. The method including a barcode sticker stuck onto the package into which a shipment is packed in the package. The shipment is packed into a container, the container is moveably attached to a beginning of a rail that leads to a landing platform. A door of the container is closed and the bar code is canned and sensors sense inside the container to receive confirmation that the shipment is inside the container and the door is closed respectively. The container is moved towards a conveyer by a mechanism operatively attached on the rail. The conveyer operably attached to the landing platform. The shipment is removed from the container and the shipment is stored in the conveyer to await an arrival of an aerial vehicle. Upon arrival of the aerial vehicle, conveying the shipment onto a footprint of the landing platform and after the conveying of the shipment onto the footprint, the container may be returned back to the beginning of the rail.

Upon a correctly aligned docking of the aerial vehicle on a footprint of the landing platform, the doors of the hold of the aerial vehicle are opened responsive to correctly aligned docking of the aerial vehicle. The docking also further enables charging a battery of the aerial vehicle. The shipment is received from the conveyer into the hold of the aerial vehicle. During the receiving of the shipment into the hold of the aerial vehicle, a camera of the aerial vehicle senses and reads thereby, the bar code of the shipment in the hold. The reading of the barcode enables a flight controller of the aerial vehicle to set a flight plan for a delivery of the shipment to a specific location. The doors of the hold are closed and upon a confirming that the doors are closed, the shipment is attached in the hold responsive to the sensing and the charging of the battery used to power the aerial vehicle is sufficient to get the shipment to the specific location. The aerial vehicle is enabled to take off towards the specific location subject to the confirming. The docking may enable recharging of the batteries that power the aerial vehicle.

A method for a delivery system to receive a shipment packed in a package. The method includes landing and docking an aerial vehicle on a unique position of footprint of a landing platform mounted to a building according to sensed information of a barcode attached to the shipment, thereby sorting and designating where the shipment contained in the hold of the aerial vehicle is to be sent to a delivery point of the building. The docking may enable recharging of the batteries that power the aerial vehicle.

A door of a hold of the aerial vehicle is opened and the shipment is removed from the hold. The shipment is inserted into a container responsive to the docking connecting the container to a conveyer operably attached to the landing platform. The doors of the container are closed and a confirming that the doors of the container are closed is made. Further that the shipment is in the container responsive to a sensing of the bar code and a proper location and attachment of the shipment in the container. The container is conveyed on a rail operably attached to the conveyer. A mechanism of the container, leads the container from the conveyer along the rail to the delivery point of the building.

The foregoing and other objects are achieved by the features of the independent claims. Further implementation forms are apparent from the dependent claims, the description and the figures.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced. In the drawings.

DESCRIPTION OF SPECIFIC EMBODIMENTS OF THE INVENTION

Figure 1A:
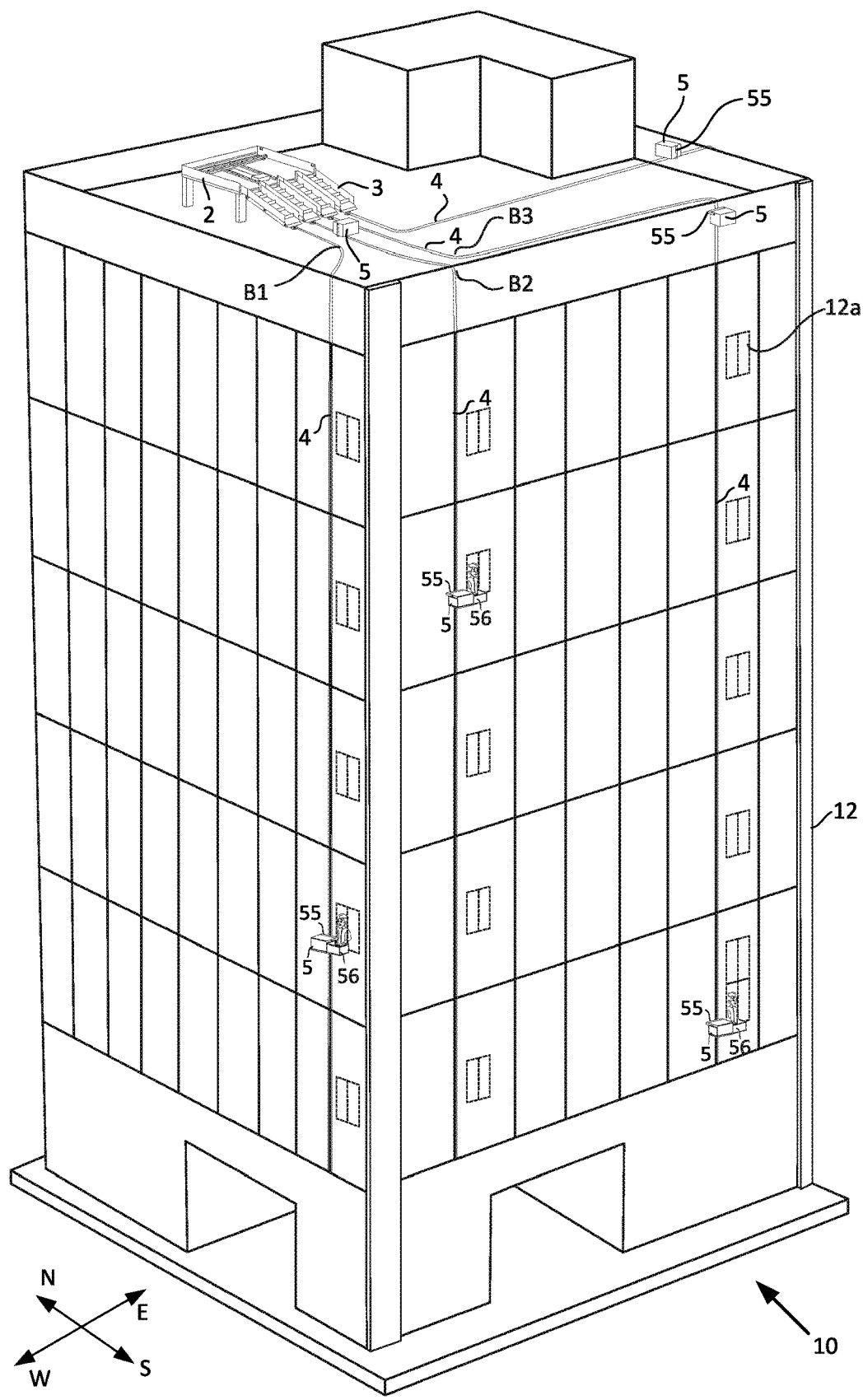
FIG. 1A shows a perspective view of a delivery system installed on an exterior of a building, in accordance with some embodiments.

The present disclosure, in some embodiments thereof, relates to a delivery system that includes a landing pad and, more specifically to mechanisms to load and unload shipments from an aerial vehicle, but not exclusively to aerial vehicles.

By way of introduction aspects of the disclosure below, describe a provision of a landing platform for drones but not only for drones, a computer software product, a method for a delivery system, and more specifically a landing pad for unloading, loading, sorting and storing shipments. The landing platform is connected to a number of rails via multichannel conveyor system. The rails external to a structure to which a box is connected which can move down, up and sideways. Certain aspects solve problems that exist today when the unloading and loading of an unmanned aerial vehicle (UAV) are done without any human contact and thus allows landing on top of all types of buildings including high-rises without endangering the population by landing close to the ground. In an example of the unloading of an unmanned aerial vehicle (UAV), a control unit of the delivery system, that knows how to transmit waypoints to the UAV and fully charge it when landing on the landing platform. Further in the unloading to perform a controlled sorting of the shipments and store them in the channels of the conveyer until they are transferred to a container which is connected to a rail that will lead a shipment inserted into the container directly to a window of a consumer. Further, in an example of the loading, the control unit to aspects to enable an insertion of a shipment into a container at a window of a consumer and lead the shipment towards the conveyor connected to the landing platform to enable an insertion of the shipment into a hold of the UAV.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A, which shows a perspective view of a delivery system installed on an exterior of a building 12, in accordance with some embodiments. Atop of a floor of building 12 is mechanically attached a landing platform 2 by four legs included in platform 2. Landing platform 2 at one raised side connects to a conveyor 3. The other end of conveyor 3 mechanically attaches to the floor of building 12 to provide a ramp feature between the floor and the one raised side of platform 2 that connects to conveyor 3. Conveyor 3 is shown with four separate conveyer channels that moveably attach to four respective rails 4. The four respective rails 4 radiate outwards from platform 4 and are mechanically attached to the rooftop. Rails 4 radiate out horizontally so that one rail 4 goes toward the western W side, two rails go to the southern side S and one rail 4 goes to the eastern side of building 12 across the rooftop of building 12.

Where each side of building 12 meats the rooftop, the rails 4 are bent at ninety degrees (90°) to go down and be mechanically attached to the west W, south S and east E sides of building 12. On top of building 12, rails 4 are bent with bends B1 and B3 respectively laterally left and right at angles greater than ninety degrees, whereas bend B2 is bent at ninety degrees to go down the south side of building 12. Rail 4 may include two tracks (not shown) which are circular in cross section to allow bends in rail 4 which are not deformed and enable the conveying of container 5 between a window 12a and conveyor 3. Where a container 5 stops outside a window 12a, a user is able to remove tray 56 from container 5 and remove or insert a shipment from or into container 5.

Container 5 moveably attaches to rail 4, with a pivoted handle 55 so that container 5 is able to move between a window 12a on a side of building 12 and conveyor 3 to maintain the orientation of container 5. While four rails 4, four channels of conveyor 3 and four containers 5 are shown included in delivery system 10, it should be noted that in general, one or more rails 4, channels of conveyor 3 and containers 5 of delivery system 10 may be installed on an exterior of a building.

Figure 1B:
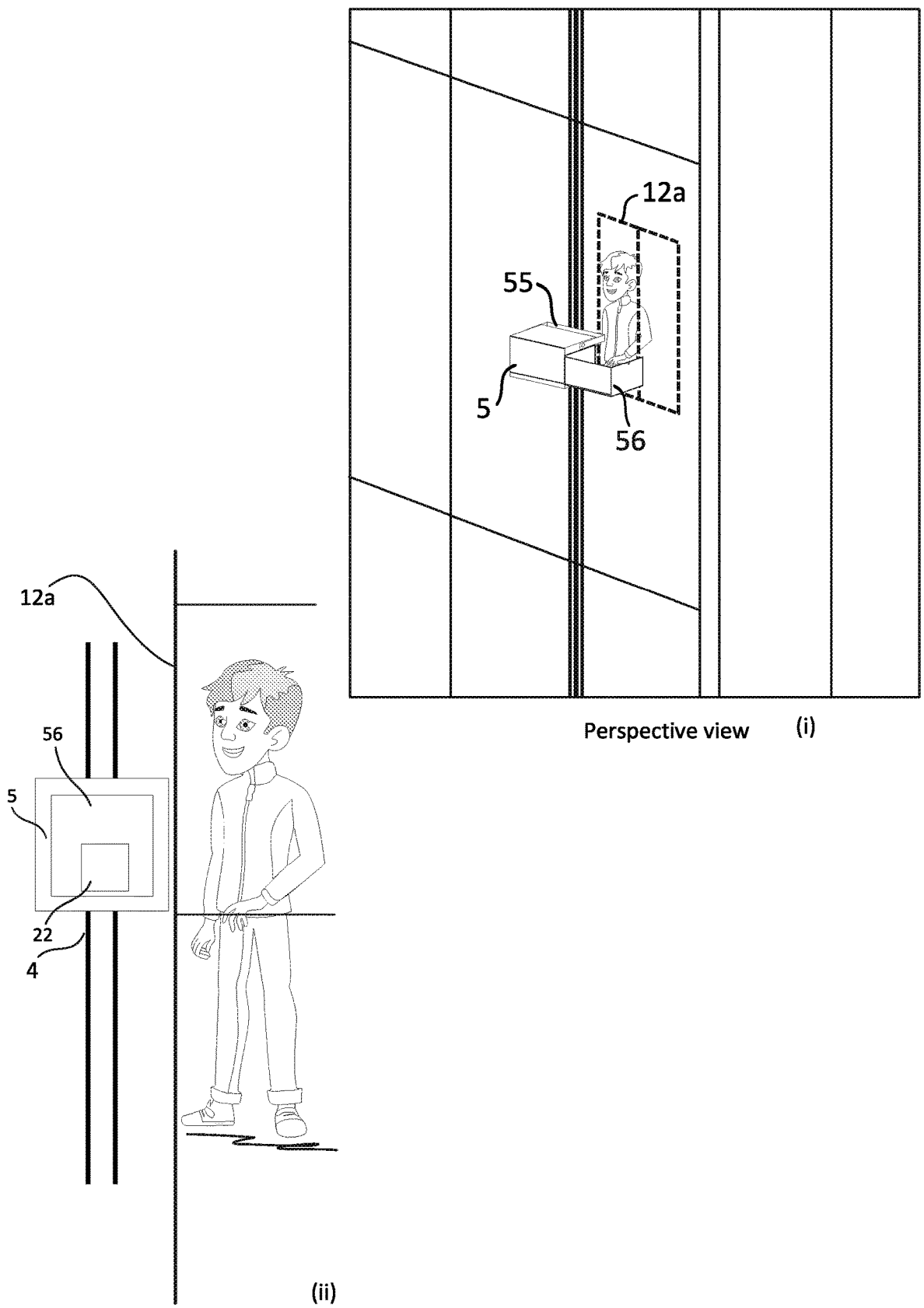
FIG. 1B shows a perspective view and a side view of a delivery system installed on an exterior of a building, in accordance with some embodiments.

Reference is now made to FIG. 1B, which shows a perspective view (i) and a side view (ii) of a delivery system installed on an exterior of a building, in accordance with some embodiments. In perspective view (i) a user is shown stood by the window 12a of building 12 with a container 5 moveably attached to rail 4 and laterally adjacent to window 12a and the user in a position to allow tray 56 to be slid in and out of container 5. The position further allows the user to remove or insert a shipment from or into container 5. In side view (ii), the user is shown stood by the window 12a of building 12 with tray 56 in a position where tray 56 is pulled out laterally to the left. In the position, tray 56 is in close proximity to the outer wall/window 12a and the width of tray 56 extended is approximately the same width of the opening of window 12a. Further included in the position, the bottom of tray 56 at windowsill height and waist height of the user. The position therefore, enables two-safety features; first, tray 56 with its three walls and base in close proximity to the outer wall/window 12a, prevents a package 22 from falling to the ground when package 22 is placed or being removed from tray 56. Secondly, the bottom of tray 56 at windowsill height and waist height of the user avoids a potential fall of the user to ground when the user slides in and out tray 56 and when the user places or removes package 22 from tray 56.

Figure 2:
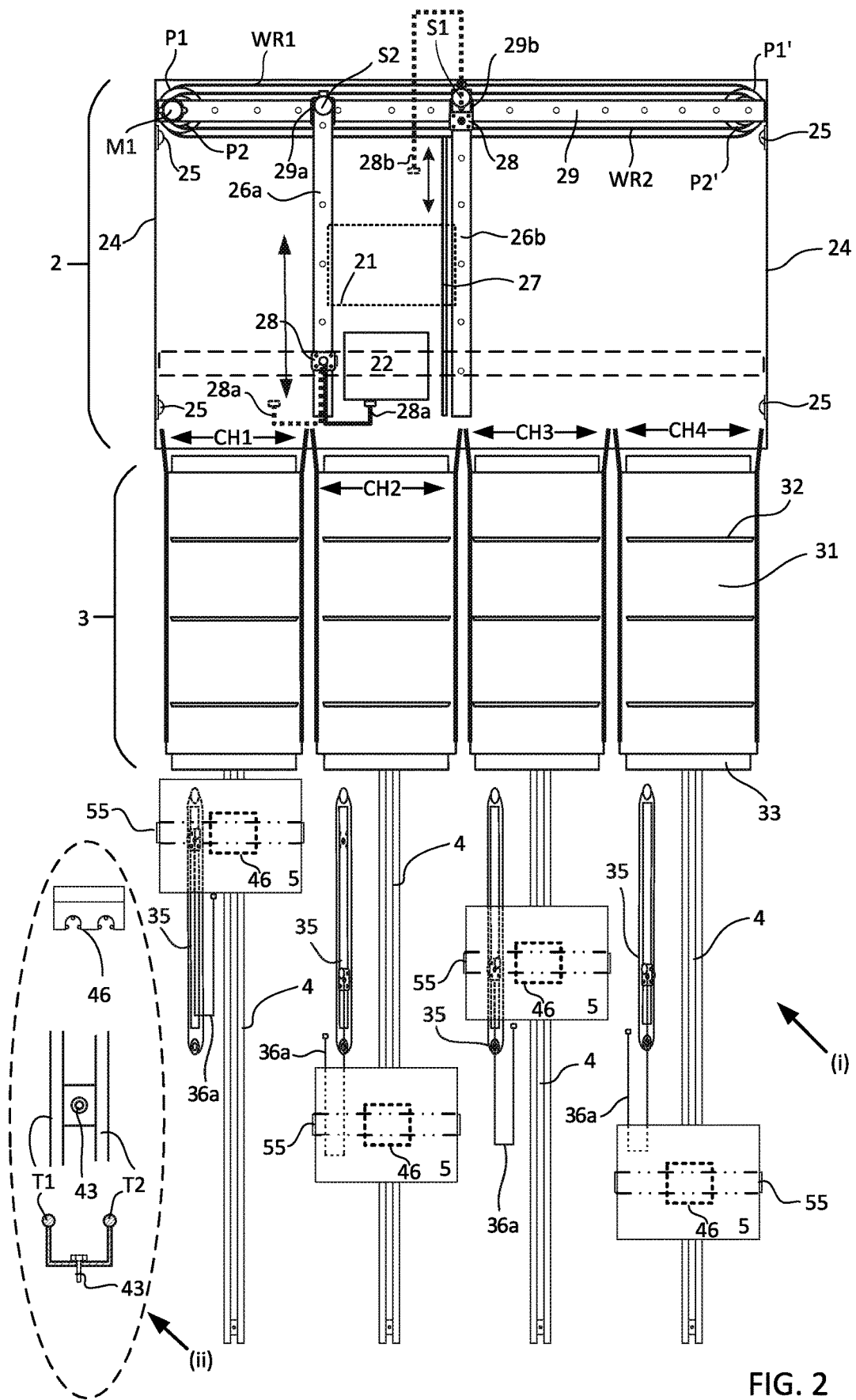
FIG. 2 shows a top view of further details of a landing platform, a conveyor and rails, in accordance with some embodiments.

Reference is now made to FIG. 2, which shows a top view (i) of further details of landing platform 2, conveyor 3 and rails 4, in accordance with some embodiments. A rail 4 runs from a point or a window on a side of building 12 to a locking actuator 33, locking actuator 33 is operably attached to a channel of conveyor 3. The same arrangement applies to each of the other rails 3 running from other windows or points on other sides of building 12 to locking actuators 33 attached to respective channels CH1-CH4 of conveyor 3. Pivoted handle 55 of container 5 attaches to linear slider 46. Further details of a side view of linear slider 46 is shown in view (ii). Linear slider 46 includes four bearings that enable linear slider 46 to be moveable attached to tracks T1 and T2 of rail 4. Linear slider 46 attached to tracks T1 and T2 of rail 4 enable container box 5 to be conveyed back and forth along rail 4. Tracks T1 and T2 in a cross sectional view of rail shown in view (ii) are round in cross section so that where each side of building 12 meats the rooftop. The rails 4 are bent at ninety degrees (90°) to go down and be mechanically attached to the west W, south S and east E sides of building 12. The bending of the rail 4 and tracks T1 and T2 still allow the movement of linear slider 46 by virtue of the round cross section of tracks T1 and T2. Further in view (ii), the cross section of rail 4 shows a fork profile of rail 4 and the horizontal portion of the fork profile includes an aperture for a fastening 43 to enable rail 4 to be attached to building 12 at various points along the route of rail 4.

In top view (i), opposite of where locking actuators 33 are operably attached to multiple channels CH1-CH4, conveyer 3 attaches to platform 2. Platform 2 includes a guard rail 24 which surrounds a area of platform 2 on three sides but not on the side where conveyer 3 attaches to platform 2. Four cameras 25 are placed on the inside of the gourd rail in order to sense and monitor the movement and actions of the moveable and static parts included and mechanically attached to the landing pad area of platform 2 and an aerial vehicle interaction with platform 2.

The moveable and static parts include a linear rail 29 attached to the landing pad area of platform 2 at two ends. At the two ends of linear rail 29 are two pulley wheels P1/P1' and P2/P2' respectively. Pulley wheels P1 and P1' are rotatably attached to each other by wire WR1. Similarly, pulley wheels P2 and P2' are rotatably attached to each other by wire WR2. Rotation of pulley wheels P1 and P1' are independent of the rotation of pulley wheels P2 and P2'. Rotation of pulley wheels P1 and P1' is by a rotational connection to a motor M1 and the rotation of pulley wheels P2 and P2' by a rotational connection to another motor (not shown). Each of the two motors may further connected to sensors S1 and S2 that can count the number of revolutions made by each of the two motors. Each of the two motors may be implemented as stepper motors in order to provide the feature of counting the number of revolutions made by each of the two motors.

In top view (i), linear rail 26a at one-end attaches at right angles to linear rail 29 via a slider 29a that also attaches to wire WR2. Similarly, linear rail 26b at one-end attaches at right angles to linear rail 29 via a slider 29b that also attaches to wire WR1. Attached mechanically to and in parallel with linear rail 26b is bar 27 that includes two bus bars (not shown) for providing direct current (DC) voltage along the length of linear rail 26b. The two bus bars which may be implemented in copper are electrically isolated from each other and from bar 27 that may be implemented in aluminum. A horizontal distance between linear rail 26a and 26b defines a footprint 21 (shown by dotted rectangle) for an aerial vehicle (not shown) to land and dock on linear rails 26a and 26b. The feature of pulley wheels P1 and P1' being independent rotatable of the rotation of pulley wheels P2 and P2', enables independent horizontal movement between linear rail 26a and 26b so that the horizontal distance between linear rail 26a and 26b is variable. The horizontal distance being variable helps to accommodate different footprints 21 for different sizes of aerial vehicle with respect to the horizontal distance required. The landing and docking of the aerial vehicle may enable the DC power from the two bus bars to charge a battery of the aerial vehicle.

In top view (i), a package 22 is shown located between linear rails 26a and 26b. In a landing scenario of an aerial vehicle (not shown) onto platform 2 linear rails 26a and 26b may be sent left and right away from each other in order to provide a maximum landing pad area for the aerial vehicle. Similarly, upon takeoff of the aerial vehicle, linear rails 26a and 26b may be sent left and right away from each other in order to detach both electrical and mechanical connection of the aerial vehicle between linear rails 26a and 26b. In addition, linear rails 26a and 26b may be sent left and right away from each other to provide a maximum landing pad takeoff area for the aerial vehicle from platform 2. One of two actuators 28 including an "n" shaped rod or hook 28b may be moveably attached to linear rail 26b and moves up and down linear rail 26b and package 22.

Hook 28a shown with solid line is the position of hook 28a to enable package 22 to be pushed towards footprint 21 and into a hold of the aerial vehicle. Another actuator 28 including an "L" shaped rod or hook 28a is shown moveably attached to linear rail 26a in order to move up and down along the length of linear rail 26a. The "L" shaped rod or hook 28b shown by dashed line is shown being inserted through a slot (not shown) in guardrail 24 and is in this position when hook 28a is used to push package 22 towards footprint 21. When hook 28b is used to push down through footprint 21 in order to push a package 22 on to channel CH2 of conveyor 3, hook 28a is moved out of the way as shown with dotted line for hook 28a. The two ends of linear rails 26a and 26b not connected to linear rail 29 and package 22 are moveably connected at right angles to a rail (shown by dashed rectangle). The connection to the rail to maintain linear rails 26a and 26b parallel to each other when linear rails 26a and 26b are moved left and right by wires WR1 and WR2 of linear rail 29. In addition, package 22 is moved left and right on the landing pad of platform 2 by moveable contact with linear rails 26a and 26b to align package 22 to one of the channels CH1-CH4 of conveyor 3.

Each of the four rails 4 connected to respective channels CH1-CH4 of conveyor 3 includes a package insertion tool 35 that utilizes a hook 36a adapted to push a package 22 to one of the belts 31 and dividers 32 included in channels CH1-CH4 of conveyor 3. Package insertion tool 35 is located adjacent to rail 4 and underneath handle 55 of container 5. Hook 36a is moveable to two positions, the first position shown with respect to channels CH1 and CH3 are activated where containers 5 have travelled sufficiently forward or are located at locking actuator 33 to enable a utilization of hooks 36a. The utilization of hook 36a includes the loading or unloading of a package 22 onto or off conveyor 3. Where container 5 has not travelled sufficiently forward towards locking actuator 35, the respective hooks 36a of channels CH2 and CH4 are shown in the second position to not impede the travel of container 5 to and from the respective locking actuators 33.

Figure 3A:
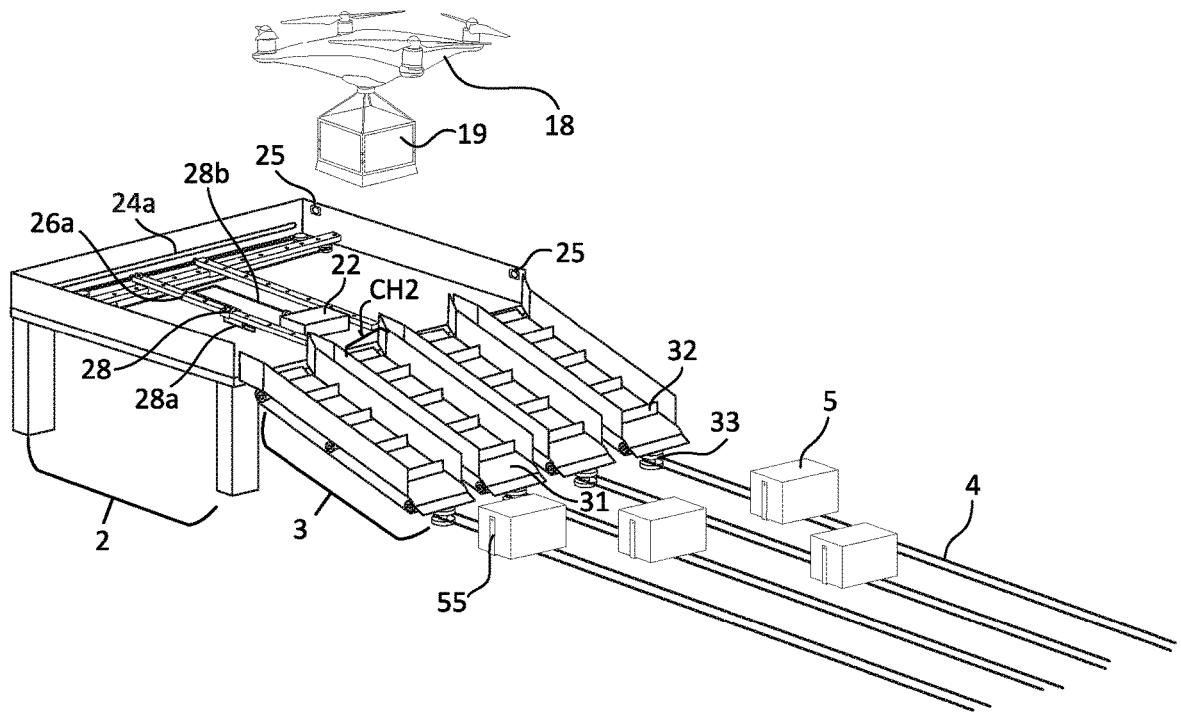
FIG. 3A, which shows a side view of a platform, a conveyor 3 and rails 4, in accordance with some embodiments.

Reference is now made to FIG. 3A, which shows a perspective view of delivery system 10, in accordance with some embodiments. Aerial vehicle 18 with its hold 19 is shown hovering above platform 2 above package 22 that is aligned with channel CH2 of conveyer 3. Cameras 25 that placed sense and monitor the movement and actions of the moveable and static parts included and mechanically attached to the landing pad area of platform 2 and a takeoff and landing/docking of aerial vehicle 18/hold 19.

Upon successful landing/docking of aerial vehicle 18/hold 19, the doors of hold 19 are opened. Container 5 associated with channel CH2 of conveyor 3 is utilized to receive a shipment held in hold 19 or convey a shipment into hold 19. A mechanism (not shown) of rail 4 advances container 5 towards CH2 of conveyor 3. When container 5 is mechanically engaged with a locking actuator 33, a mechanism of container 5 activated by a lever (not shown), enables door 53 to open to receive a shipment from channel CH2 of conveyor 3. The shipment is pushed out through the open doors of hold 19 by actuator 28, using hook 28b and onto footprint 21 making use of ramp 19c. Then by further use of hook 28b, the shipment is pushed onto channel CH2 of conveyor 3. Channel CH2 than conveys the shipment to container 5, where conveyor belt 31 of channel CH2 and its divider 32 pushes the shipment into container 5. Use of hook 28b in this case means that hook 28a is to the left of linear 26a in order not to impede the operation of hook 28b. Similarly, when hook 28a is being utilized, hook 28b is inserted through slot 24a to not impede the operation of hook 28a.

Figure 3B:
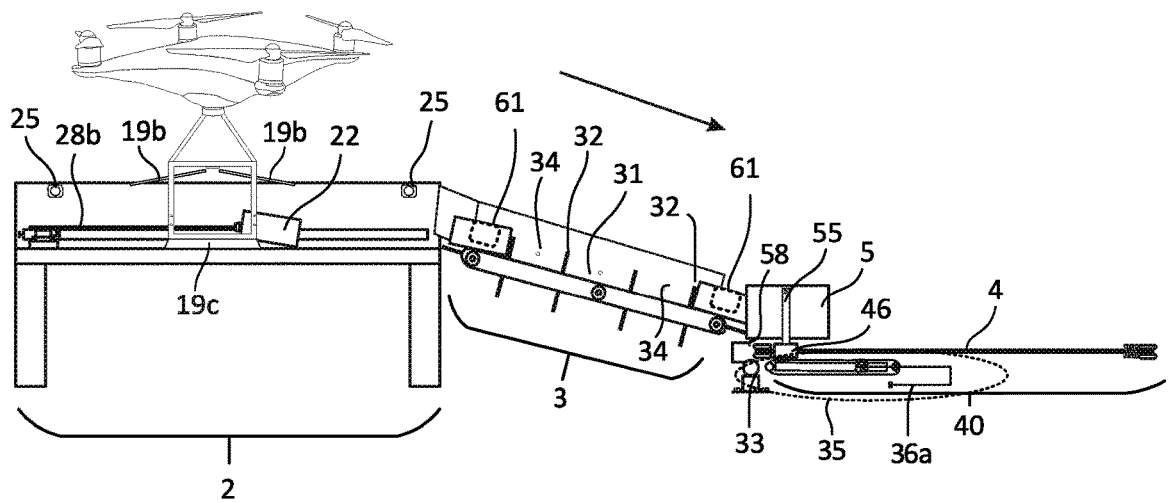
FIG. 3B shows further details of a container, in accordance with some embodiments.

Reference is now made to FIG. 3B, which shows a side view of delivery system 10, in accordance with some embodiments. Under the control of a control unit (not shown) of delivery system 10, mechanism 40 of rail 4 advances container 5 towards a channel of conveyor 3. When container 5 is mechanically engaged with locking actuator 33, a mechanism of container 5 enables door 53 to open to receive a shipment 61 from a channel of conveyor 3. Position sensors 34 track the presence and progress of a shipment 61 packed in package 22, for container 5 to receive shipment 61 from a successful landing/docking of aerial vehicle 18/hold 19. The successful landing/docking of aerial vehicle 18/hold 19 enables shipment 61 packed in package 22 to be pushed out through the open doors 19b of hold 19 by actuator 28, using hook 28b applied to package 22. By further use of hook 28b, the shipment is pushed onto a channel of conveyor 3 via ramp 19c.

Motors (not shown) moveably connected to conveyer 3 are driven in a correct rotational direction to convey shipment 61 on belt 31 between two dividers 32 to enable an insertion of shipment 61 into container 5. Under further control of the control unit applied to mechanism 40, shipment 61 is sent along rail 4 to a point of building 12. The point may be a window or balcony and a person can remove tray 56 to receive shipment 61. Similarly, a person can remove tray 56 to insert shipment 61 into container 5. Under the control of the control unit, the correct rotational direction is applied to mechanism 40 so that container 5 is sent along rail 4 to locking mechanism 33. Locking mechanisms 33 are attached to respective channels CH1-CH4 of conveyer 3.

Figure 4A:
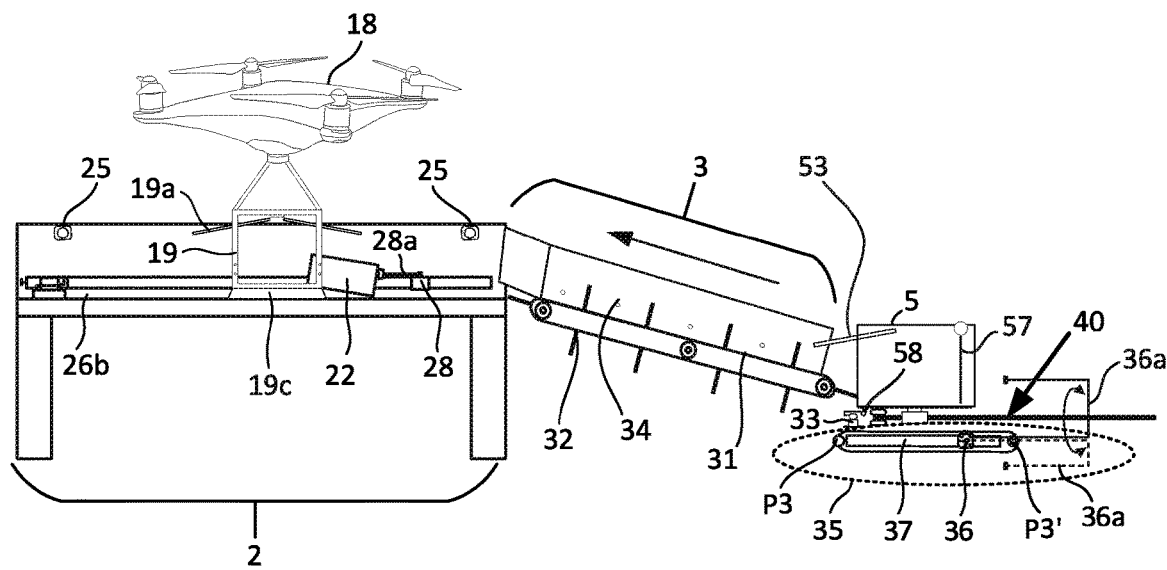
FIG. 4A shows a perspective view of a delivery system, in accordance with some embodiments.

Reference is now made to FIG. 4A, which shows a side view of platform 2, conveyor 3 and rails 4, in accordance with some embodiments. Container 5 is shown moved along on rail 4 with mechanism 40 and linear slider 46. Hook mechanism 35 including actuator 36 and hook 36a moves back and forth along linear rail 37 between pulleys P3 and P3' by a motor (not shown) enables the loading or unloading of a shipment onto or off conveyor 3. Hook 36a has two positions indicated by solid line and dashed line. The solid line shows the case when a package 22 is pushed out of container onto belt 31 of conveyor 3 through door 57. Door 57 pushes in from right to left but is not pushable out from left to right. The dashed line is when hook 36a is laid to the side of mechanism 40/rail 4 so as not to impede the travel of container 5 back and forth along rail 4.

Sensors 34 sense the presence of the shipment on conveyor 3 between the belt 31 and divider 32. Package 22 is shown attached to linear rail 26b, actuator 28 is shown moveably attached to linear rail 26b. Container 5 further includes a mechanism (not shown) powered by 12 volts (v) direct current (DC) or any other appropriate DC voltage at the bottom corners of container 5 or by a battery that may be included in container 5. When container 5 is mechanically engaged with a locking actuator 33 by lever 58 of the mechanism, the mechanism is activated mechanically and/or electro-magnetically when powered by the 12 v DC or the battery to open door 53. Activation of the mechanism enables an insertion or removal of a shipment included in package 22, to or from container 5 by use of hook mechanism 35. Aerial vehicle 18 and its hold 19 is shown docked between linear rails 26a and 26b.

The action of docking hold 19 is shown between linear rails 26a and 26b causes doors 19a to open on at least two sides of hold 19. In the scenario presented, package 22 has been removed from container 5, conveyed by conveyor 3 towards actuator 28, where actuator 28 is engaged to use hook 28a to push and insert package 22 into hold 19 through an open door 19a with the help of ramp 19c. The conveying of package 22 by conveyor 3 on belt 31 is between two dividers 32 can be sense by sensors 34. Cameras 25 sense and image an activity of a shipment or aerial vehicle 18 including hold 19 on landing platform 2. The activity may further be monitored by sensors and/or camera included in hold 19 to confirm safe, secure and a correct insertion of the correct package 22 into hold 19 by reading or scanning a barcode attached to package 22. The barcode may include the shipment number, the weight of a shipment, the order number and the name and address of the sender or receiver of a shipment.

Figure 4B:
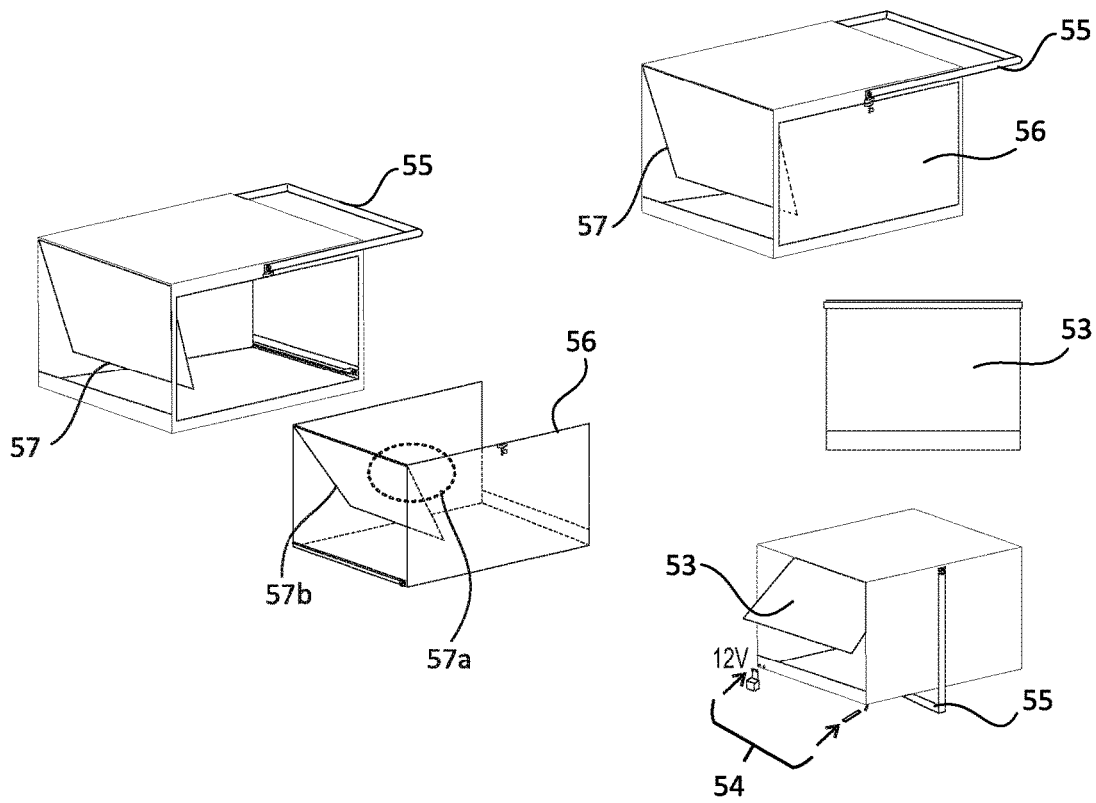
FIG. 4B shows a side view of a delivery system, in accordance with some embodiments.

Reference is now made to FIG. 4B, which shows further details of container 5, in accordance with some embodiments. Container 5 moveably attaches to rail 4 (not shown), with a pivoted handle 55 further attached to linear slider 46 (not shown) includes two bearings that enable linear slider 46 to be moveable attached to two parallel tracks (not shown) of rail 4. Pivoted handle 55 enables the orientation of container 5 to be maintained while container 5 moves back and forth between a point on a side of building 12 and conveyor 3. Container 5 includes a removable tray 56 that is removable when container is located at the point on the side of the building 12. The point may be a window or balcony and a person removing tray part way out from container 5 enables the insertion or removal of a shipment packed in (not shown). Container 5 includes rails that enable tray 56 to be slid in and out of container 5. Tray 56 further includes a swing door 57b, when tray 56 is inserted in container 5 both door 57 and swing door 57b swing inwards for example when a package 22 is pushed out of container 5 onto belt 31 of conveyor 3 through door 57 and swing door 57b. A spring mechanism 57a may be included in both tray 56 and container 5 to maintain that door 57 and swing door 57b are closed for example when container box 5 is conveyed back and forth along rail 4.

Container 5 further includes a mechanism (not shown) mechanically activated by lever 58 and/or electromagnetically powered by a battery that may be included in container 5, 12 volts (v) direct current (DC) or any other appropriate DC voltage applied at the bottom corners of container 5. When container 5 is mechanically engaged with a locking actuator 33, the mechanism is activated and/or electromagnetically powered by the 12 v DC to open door 53. Activation of the mechanism enables an insertion or removal of a shipment to or from container 5 by use of hook mechanism 35. The mechanical mechanism may be similar to a mechanism of hold 19 that opens doors 19a of hold 19 described in further detail in descriptions that follow.

In general, a mechanism of container 5 activated by lever 58 enables door 53 to open so that hook mechanism 35 enables a loading and/or an unloading of shipment 61 onto or off a channel of conveyor 3. Motors (not shown) moveably connected to conveyer 3, under control of the control unit are driven in a correct rotational direction to convey shipment 61 on belt 31 between two dividers 32 towards hold 19 or away from hold 19. A divider 32 and further use of hook 28a applied to package 22 to push out shipment 61 onto conveyor 3 as part of the unloading of hold 19. When aerial vehicle 18 lands/docks opening doors of hold 19, hook 28b pushes shipment 61 towards footprint 21 between linear rails 26a and 26b to enable the loading of shipment 61 into hold 19 of aerial vehicle 18.

Figure 5:
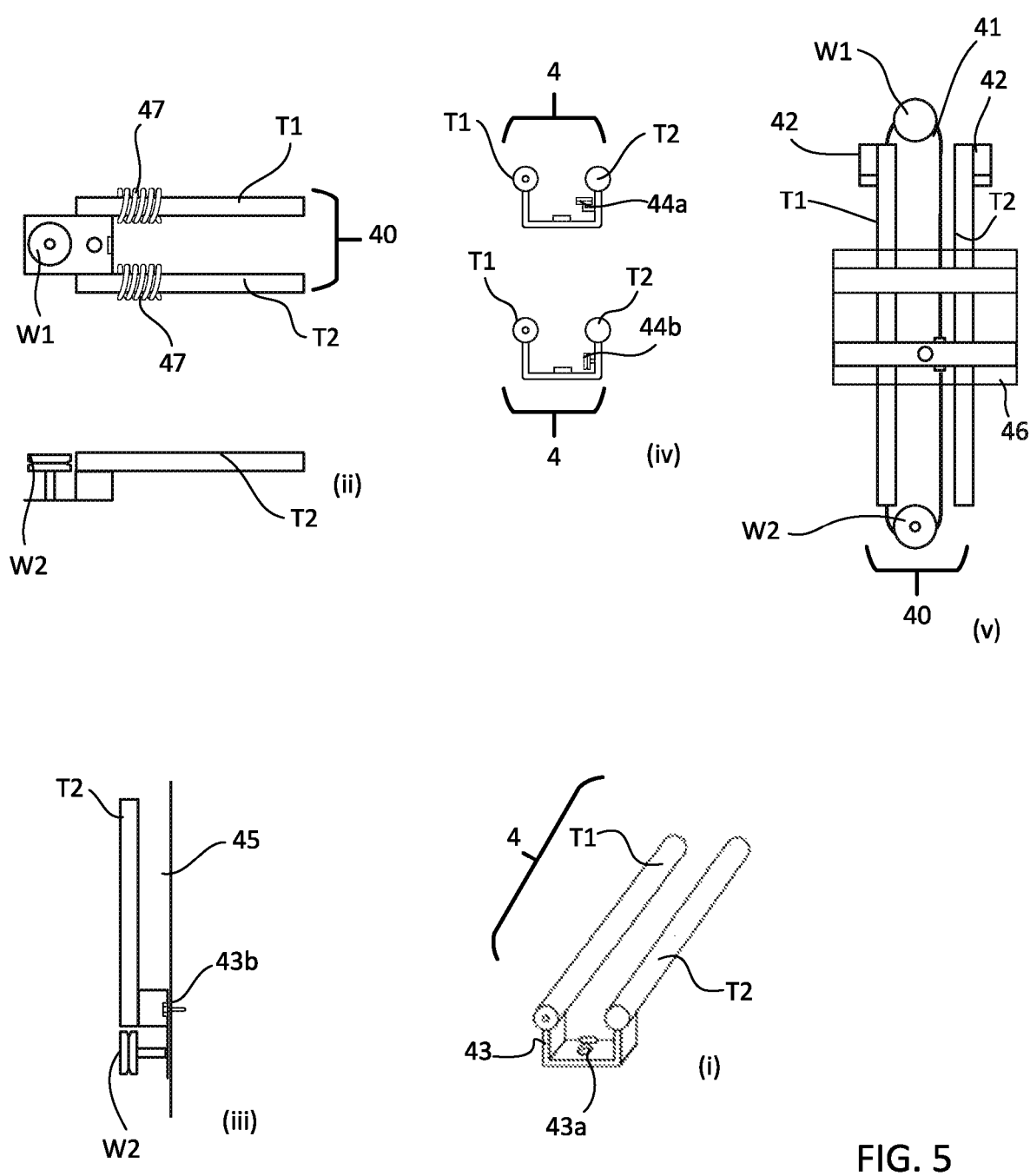
FIG. 5 shows further details of a mechanism, in accordance with some embodiments.

Reference is now made to FIG. 5, which shows further details of a mechanism 40, in accordance with some embodiments. In perspective view (i), further details of rail 4 are shown that include U shaped bracket 43 that in includes two rails T1 and T2 attached at right angles to the respective ends of the vertical sides of U shaped bracket 43. A hole 43a through the horizontal base of U shaped bracket 43 enables for example a situation where multiple U shaped brackets 43 enable the two rails T1 and T2 of rail 4 to be attached to the sides and the rooftop of building 12. Tracks T1 and T2 in a cross sectional view of rail shown in view (i) are round in cross section so that where each side of building 12 meats the rooftop. The rails 4 may be bent at ninety degrees or at any other angle according to the structure of another building, to go down and be mechanically attached to the west W, south S and east E sides of building 12. An appropriate fastener 43b, a Rawl Bolt™ for example, to utilize hole 3 may be used to attach rail 4 to concrete or brick parts of building 12. The bending of the rail 4 and tracks T1 and T2 still allow the movement of linear slider 46 by virtue of the round cross section of tracks T1 and T2. With respect to view (ii), two springs 47 are located at the end of rail 4 at a location on the side of the building. The two springs 47 are designed to stop container 5 from falling in the event of a failure of cable 41.

In perspective view (v), mechanism 40 is shown in detail, two pulley wheels W1 and W2 are rotatably attached to a structural exterior surface of building 12 and to a motor (not shown). The structural surface may be a side or a rooftop of building 12. Pulley wheels W1 and W2 are rotationally connected to by wire 41. Wire 41 passes through track T1 which is hollow in cross section as shown in views (i) and (iv) and through linear slider 46 and fastens to wire 41 at ninety degrees relative to the axis of linear slider 46. Pivoted handle 55 of container 5 attaches to linear slider 46. Linear slider 46 includes four bearings that enable linear slider 46 to be moveable attached to tracks T1 and T2 of rail 4. Linear slider 46 attached to tracks T1 and T2 of rail 4 enable container box 5 to be conveyed back and forth along rail 4. Pulleys 44*a* and 44*b* may be located on the first or second track along the length of rail 4 at various points to enable the movement of wire 41 between pulley wheels W1 and W2.

Two guides 42 attached to tracks T1 and T2 at the end of rail 4, where rail 4 is attached to conveyer 3. The two guides 42 are included in locking actuator 33. When container 5 is mechanically engaged with locking actuator 33, a door opening mechanism of container 5 activated by lever 58, enables door 53 to open to receive a shipment from channel CH2 of conveyor 3 or to give a shipment to channel CH2 from container 5 by utilization of hook mechanism 35. The purpose of the two guides 42 is to prevent the bottom edge of the base of container 5 attached to linear slider 46 from curling under channels (CH1-CH4) of conveyor 3, during loading and unloading of shipment 61 to and from channels (CH1-CH4) of conveyor 3. Two guides 42 may be implemented in plastic, for example Polytetrafluoroethylene (PTFE) to enable a less frictional loading and unloading of shipment 61 to and from channels (CH1-CH4) of conveyor 3 and to maintain proper alignment of container 5.

Side view (iii) shows track T2 and fastener 43*b* fastening U shaped bracket 43 to concrete or brick parts 45 of building 12. The motor attached to wheel W1 and/or wheel W2 under the control of a control unit ensures that the correct rotational direction is applied to the motor mechanism 40 to enable container 5 to be conveyed back and forth along rail 4. The motor may additionally include a break (not shown) to keep container 5 in a static position. The motor may be connected to a sensor (not shown) that can count the number of revolutions made by the motor. The motor may be implemented as a stepper motor in order to provide the feature of counting the number of revolutions made by the motor to enable a tracking and control feature of container 5.

Figure 6:
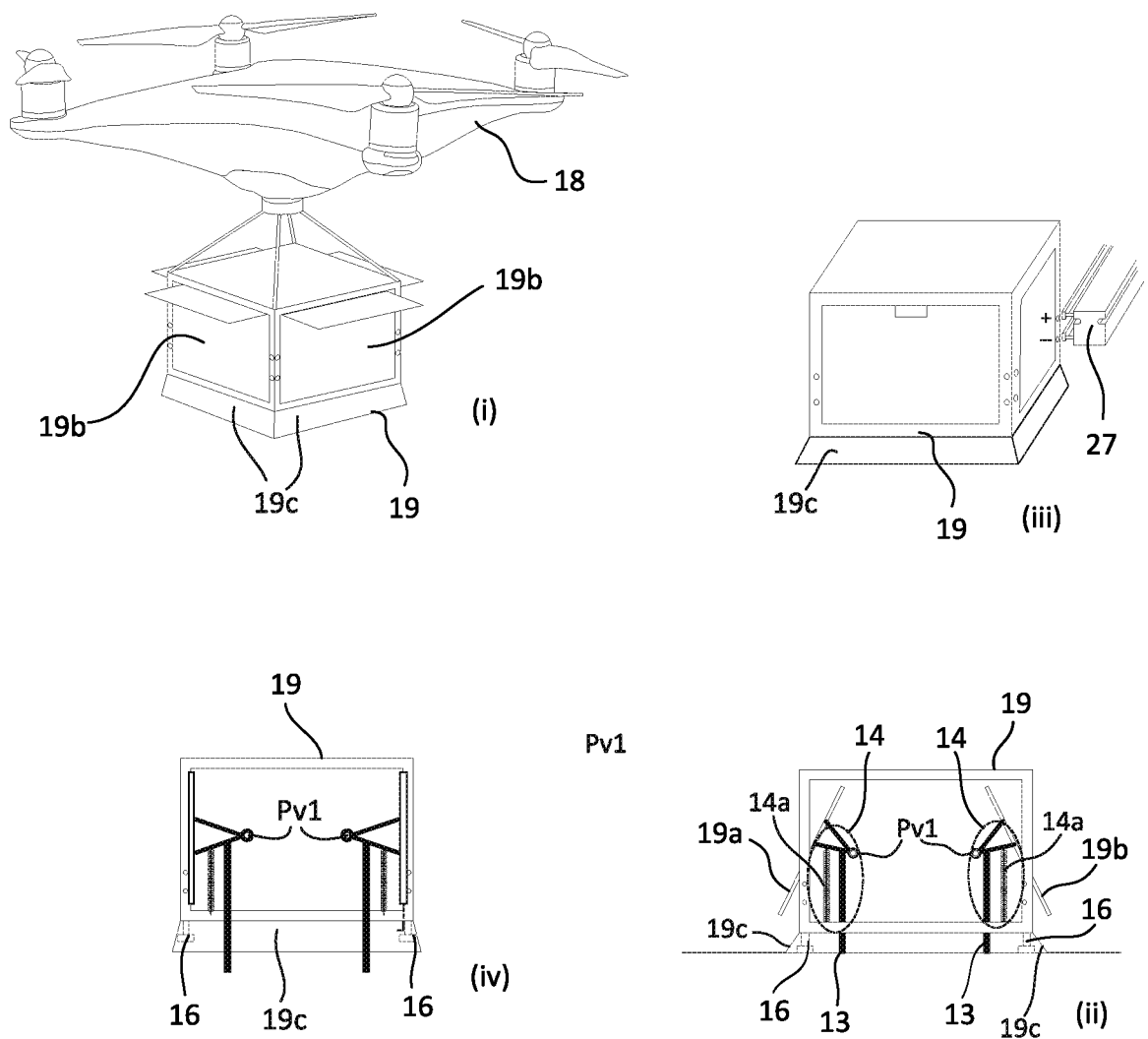
FIG. 6 shows further details of a hold of an aerial vehicle, in accordance with some embodiments.

Reference is now made to FIG. 6, which shows further details of a hold 19 of aerial vehicle 18, in accordance with some embodiments. In view (i) aerial vehicle 18 is shown attached to hold 19. Hold 19 includes four doors 19*b* that are closed during flight and four flaps that form four ramps 19*c* which are formed when aerial vehicle 18 lands and docks on platform 2. With respect to view (ii), hold 19 is shown in its landed/docked position on its landing skids 16. Each of the four flaps by virtue of landing/docking hold 19 extend outward to form a ramp angle of approximately forty five degrees (45°), whereas in view (iv), hold 19 is not landed/docked and the ramp angle is less than forty five degrees (45°).

Landing skids 16 are placed diagonally towards platform 2 to allow stable unloading and loading of the shipment (61) from and to a channel (CH1-CH4) of the conveyer (3). In the landing position Mechanism 14 by virtue of landing/docking between linear slider 26*a* and 26*b* enables doors 19*a* to be opened about pivot point Pv1 upon successful docking. Spring 14*a* of mechanism 14 is held less compressively and doors 19*a* are open by virtue of lever 13 being pushed up when hold 19 is docked between linear rails 26*a* and 26*b*. When aerial vehicle 18 takes off, spring 14*a* of mechanism 14 is held more compressively enabling doors 19*a* to close. View (iv) shows hold 19 and its landing skids 16 not landed/docked with doors 19*a* closed. View (ii) shows a result of landing and docking hold 19 of aerial vehicle 18 onto the landing pad of platform 2. The docking connects electrically by to two bus bars of bar 27. The docking therefore provides direct current (DC) voltage along the length of linear rail 26*b* to the batteries of aerial vehicle 18 and hold 19.

Hold 19 may additionally include volume sensors and/or a camera powered by the batteries to enable the sensing of the presence of a shipment 61 in hold 19 as well as to be able to monitor loading and unloading of shipment 61 packed in package 22. The camera may also be used to monitor the shipment while in flight and in landing and docking of hold 19 to identify any possible damage to shipment 61. Further, the camera may be used to scan a bar code attached to shipment 61 in order to identify and confirm where on platform 2 aerial vehicle is to land/dock or provide information as to where aerial vehicle 61 took off from and what shipment 61 is being carried.

Figure 7:
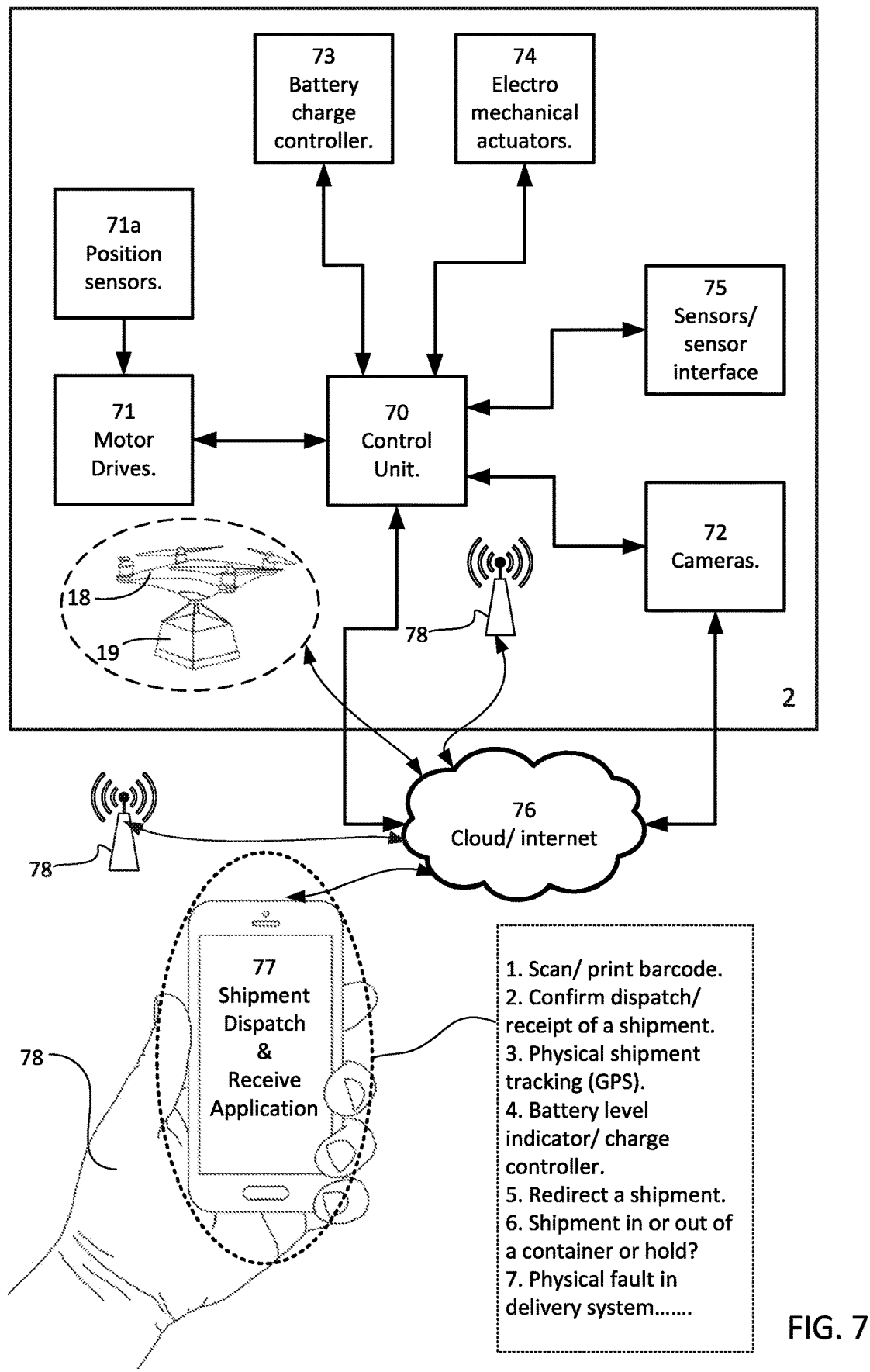
FIG. 7 shows a block diagram of a control system for a delivery system, in accordance with some embodiments.

Reference is now made to FIG. 7, which shows a block diagram of a control system for delivery system 10, in accordance with some embodiments. The control system is located in platform 2. The control system includes a control unit 70 that runs a number of algorithms to enable monitoring and control of the various parts of delivery system 10. Control unit 70 may be a single microcontroller or may include several interconnected microprocessors and/or digital signal processors (DSPs), programmable logic controllers (PLCs) and programmable control loops. Control unit 70 may be connected to the cloud or internet 76 to further enable an operative 78 of delivery system 10 via an application 77.

Application 77 enables a print of a barcode to be attached to a shipment 61 at a point in building 12 in order send the shipment 61 to platform 2 via rail 4. Application 77 may run on a smart phone or other computing device which may connect directly to cloud or internet 76 or may connect via a WiFi™ hotspot 78 to cloud or internet 76. On the other hand, a barcode of a shipment 61 delivered to platform 2 by aerial vehicle 18, may be scanned and sent to the correct delivery point of building 12. The barcode may include the shipment number, the weight of a shipment, the order number and the name and address of the sender or receiver of shipment 61.

Application 77 may further enable operative 78 of delivery system 10 to confirm a dispatch or receipt of shipment 61 and the tracking of shipment 61 contained in hold 19 of aerial vehicle 18. The tracking of shipment 61 may be by aerial vehicle 18 including a global positioning system (GPS) module connected wirelessly to cloud or internet 76 or local WiFi™ hotspots 78 at various locations on the delivery flight path of aerial vehicle 18. A battery charge controller 73 may connect to hold 19 of an aerial vehicle 18 docked on footprint 21 between linear rails 26*a* and 26*b*. Attached mechanically to and in parallel with linear rail 26*b* is bar 27 that includes two bus bars (not shown) for providing direct current (DC) voltage along the length of linear rail 26*b* to the batteries of aerial vehicle 18 and hold 19. Via communication between charge controller 73/control unit 70 and cloud or internet 76, enough charge can be provided to the batteries of aerial vehicle 18 and hold 19 to ensure enough power for vehicle 18, hold 19 and shipment 61 to arrive at another delivery location.

In a network of locations utilizing platforms 2 and the feature of charge controller 73/control unit 70, may allow for a longer distance delivery or for heavier shipments 61 to or from platform 2. Where in the network intermediate platforms 2 may serve the purpose of providing recharge to the batteries of aerial vehicle/hold 19 to complete the longer distance delivery and/or redirection of shipments 61.

Control unit 70 further connects to sensors/sensor interface 75 and cameras 72. Sensors/sensor interface 75 may include cameras 25 that placed on the inside of the gourd rail of platform 2 in order to sense and monitor the movement and actions of the moveable and static parts included and mechanically attached to the landing pad area of platform 2 and a takeoff and landing/docking of aerial vehicle/hold 19. A camera of aerial vehicle/hold 19 may also connect to either sensors/sensor interface 75 or cameras 72. Connection of cameras 72 to cloud/internet 76 may further provide real time streaming of video of a particular platform 2 and/or flight path of aerial vehicle/hold 19.

Streaming of video may also provide proof that a shipment 61 has been securely fastened to hold 19 in transit and/or to identify where a shipment may have received some kind of damage in transit. Sensors/sensor interface 75 may include sensors S1 and S2 that can count the number of revolutions made by each of the two motors that rotate pulley wheels P1 and P1' independently of the rotation of pulley wheels P2 and P2' that move linear rails 26a and 26b. Sensors/sensor interface 75 may include sensors 34 configured sense the presence of shipment 61 on conveyor 3 between the belt 31 and divider 32. Therefore, application 77 may further enable operative 78 of delivery system 10 to ascertain via sensors/sensor interface 75 where a shipment 61 is, shipment 61 is safely located in a container 5 or hold 19 that also may further may include sensors and/or cameras.

Electro mechanical actuators 74 connected to control unit 70 may include for example locking actuators 33, actuators 28 and hook mechanism 35 that may be activated under control of control unit 70 to enable loading and unloading of shipment to and from hold 19 or container 5. Motor drives 71 connected to position sensors 71a to count the revolutions of the motors are also connected to control unit 70. Motor drives 71 for example may include power to the two motors that rotate pulley wheels P1 and P1' independently of the rotation of pulley wheels P2 and P2' that move linear rails 26a and 26b. To provide power to motors for conveyer 3 to convey a shipment 61 towards footprint 21 or to convey a shipment 61 away from footprint 21 to rail 4. To provide power to motors to convey power to mechanism 40 to enable container 5 to move back and forth along the rail 4 between a point on building 12 and conveyor 3.

Figure 8A:
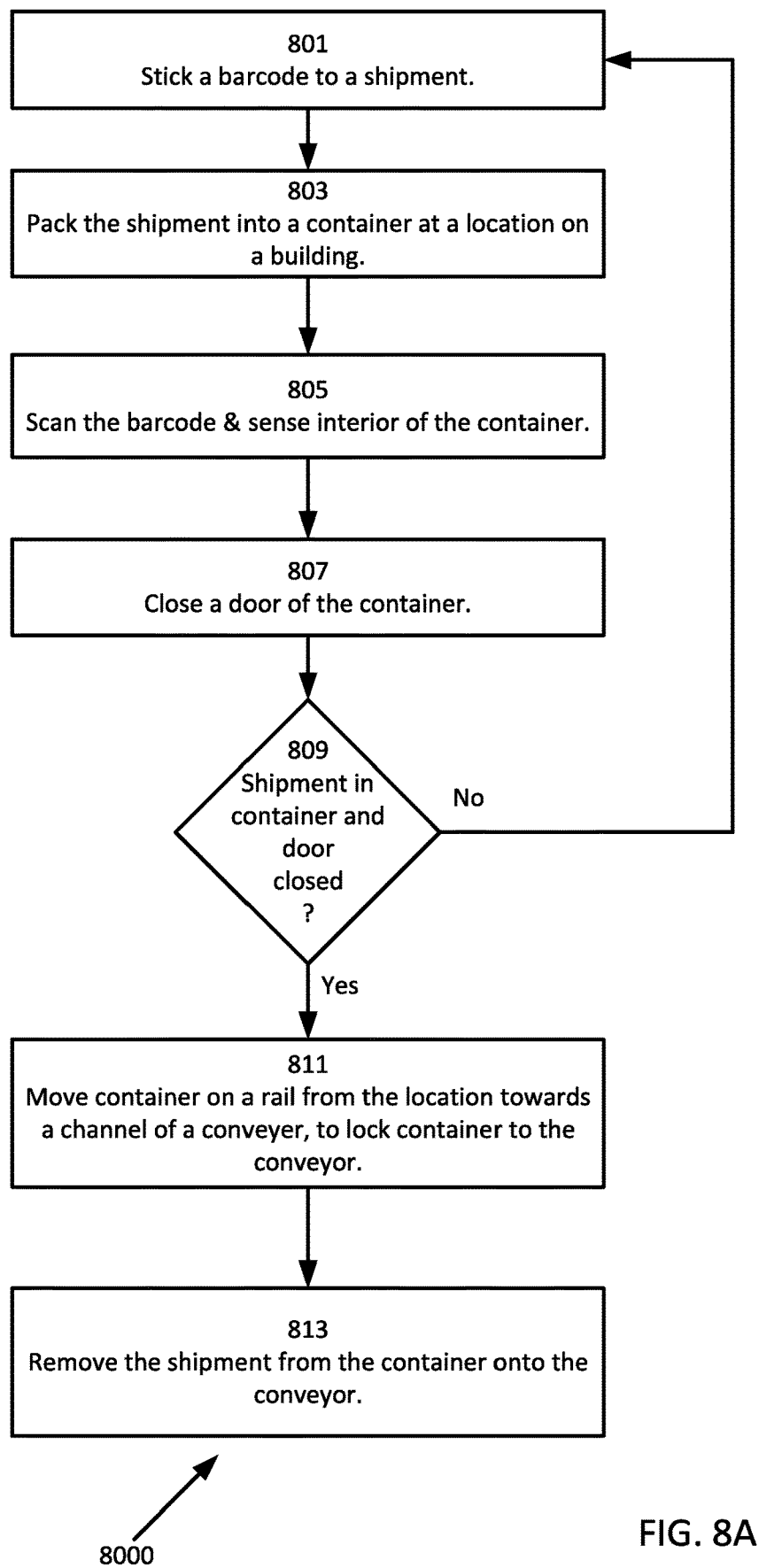
FIGS. 8A and 8B, show a flowchart and a continuation flowchart respectively of a method for a delivery system in accordance with some embodiments.
Figure 8B:
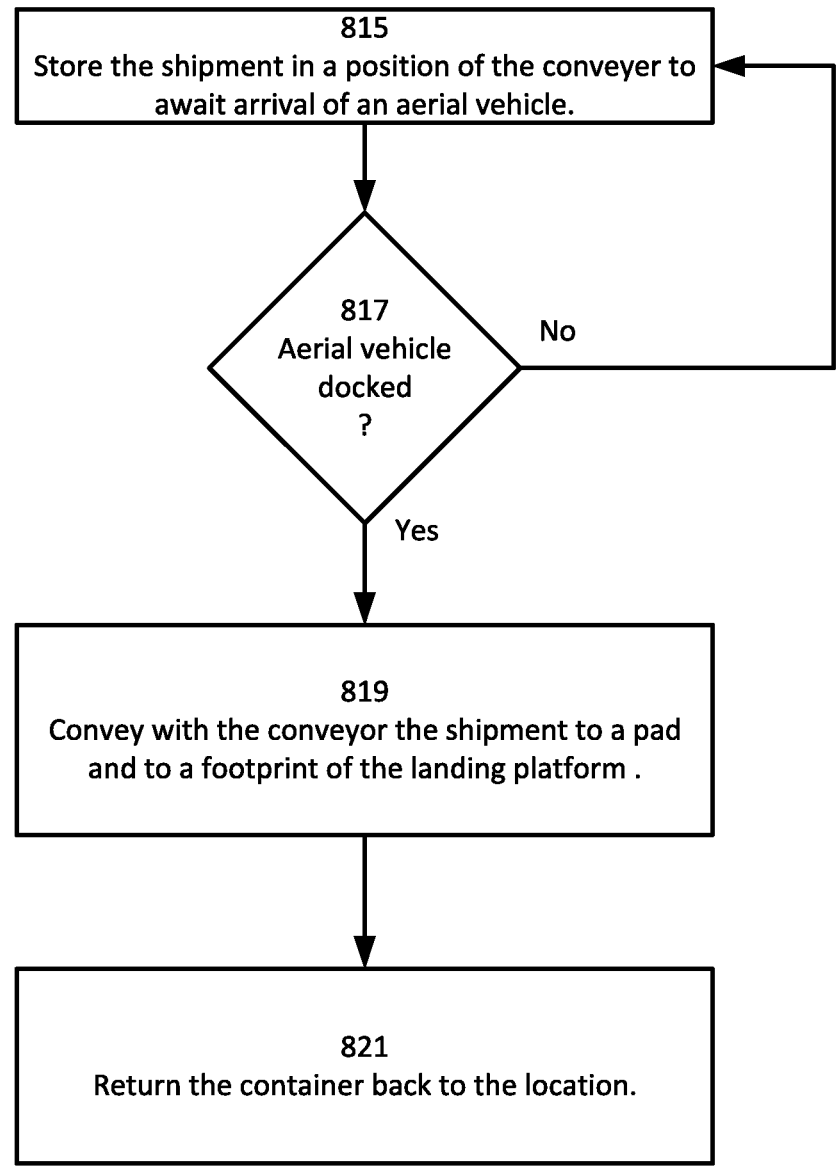

Reference is now made to FIG. 8A and FIG. 8B, which shows a flowchart and a continuation flowchart respectively of a method 8000 for delivery system 10, in accordance with some embodiments. Method 8000 includes the steps for a user to pack a shipment 61 into package 22 for delivery to another location from building 12. It is assumed, that prior to step 801, the user has previously ordered a container 5 to arrive at their location/window of building 12 in order to send shipment 61 to another location. At step 801, shipment 61 is packed in package 22, shipment 61 is sealed and using application 77, and a barcode us printed and attached to package 22. The barcode may include the shipment number, the order number and the name and address of the receiver of shipment 61. In the discussion that follows shipment 61 and package 22 are used herein interchangeably.

At step 803, container 5 is at the location/window of the user with its door 53 opened and the user pulls out tray 56 and inserts shipment 61 into tray 56. The user then inserts tray 56 into container 5. At step 805, sensors and/or a camera in container 5, scan the barcode and sense the presence of shipment 61 inside container and the user attempts a closure of door 53 at step 807.

At decision step 809, if shipment 61 is not in the container and door 53 is not closed, the user may be alerted by application 77 to repeat steps 801 and/or 803. On the other hand a mechanism of container 5 may attempt to close door 53 if the sensors detect that shipment 61 is in container 5. If shipment is in container 5 and door 53 is closed, mechanism 40 is utilized to begin the movement of container 5 on rail 4 from the location/window of the user towards, for example, channel CH2 of conveyor 3. When container 5 arrives at channel 2 and is mechanically engaged with locking actuator 33, the mechanism may be mechanically activated and/or electromechanically powered by 12 v DC to open door 53. Activation of the mechanism enables a removal of shipment 61 from container 5 by use of hook mechanism 35 at step 813 onto belt 31 of channel CH2 for example.

At step 815, belt 31 of channel CH2 is advanced a little in order to store shipment 61 (packaged in package 22) on belt 31 between two dividers 32. Sensors 34 for each separately moveable channel may monitor the presence of shipment 61 between dividers 32.

At decision step 817, if an aerial vehicle 18 has not docked to receive shipment from channel CH2, shipment 61 remains stored on belt 31 between two dividers 32 at step 815. The landing and docking of aerial vehicle 18 and hold 19 is usually performed when linear rails 26a and 26b are sent left and right away from each other in order to provide a maximum landing area for the aerial vehicle 18 onto platform 2.

Upon arrival and successful landing and docking of aerial vehicle and hold 19, motors moveably connected to conveyer 3, under control of control unit 70 are driven by motor drives 71 in a correct rotational direction to convey shipment 61 on belt 31 between two dividers 32 towards hold 19. The independent rotation of the pairs of pull wheels P1 and P1', enables an independent horizontal movement between linear rail 26a and 26b and the position of linear rails 26a and 26b themselves with respect to their alignment and the alignment of hold 19 with channel CH2 on the landing pad of platform 2. The independent horizontal distance being variable helps to accommodate different footprints 21 for different sizes of aerial vehicle 18 with respect to the horizontal distance required. Once correct alignment to channel CH2 achieved shipment 61 pushed towards and into hold 19 via ramp 19c between linear rails 26a and 26b at step 819 on the surface of the landing pad.

At step 821, mechanism 40 may be activated to return container 5 back to the location of the user. Under the control of control unit 70, the correct rotational direction is applied to mechanism 40 so that container 5 is sent along rail 4 back to the user. The correct rotational direction applied to mechanism 40 so that container 5 is sent along rail 4 back to the user may be done after step 815.

Figure 9A:
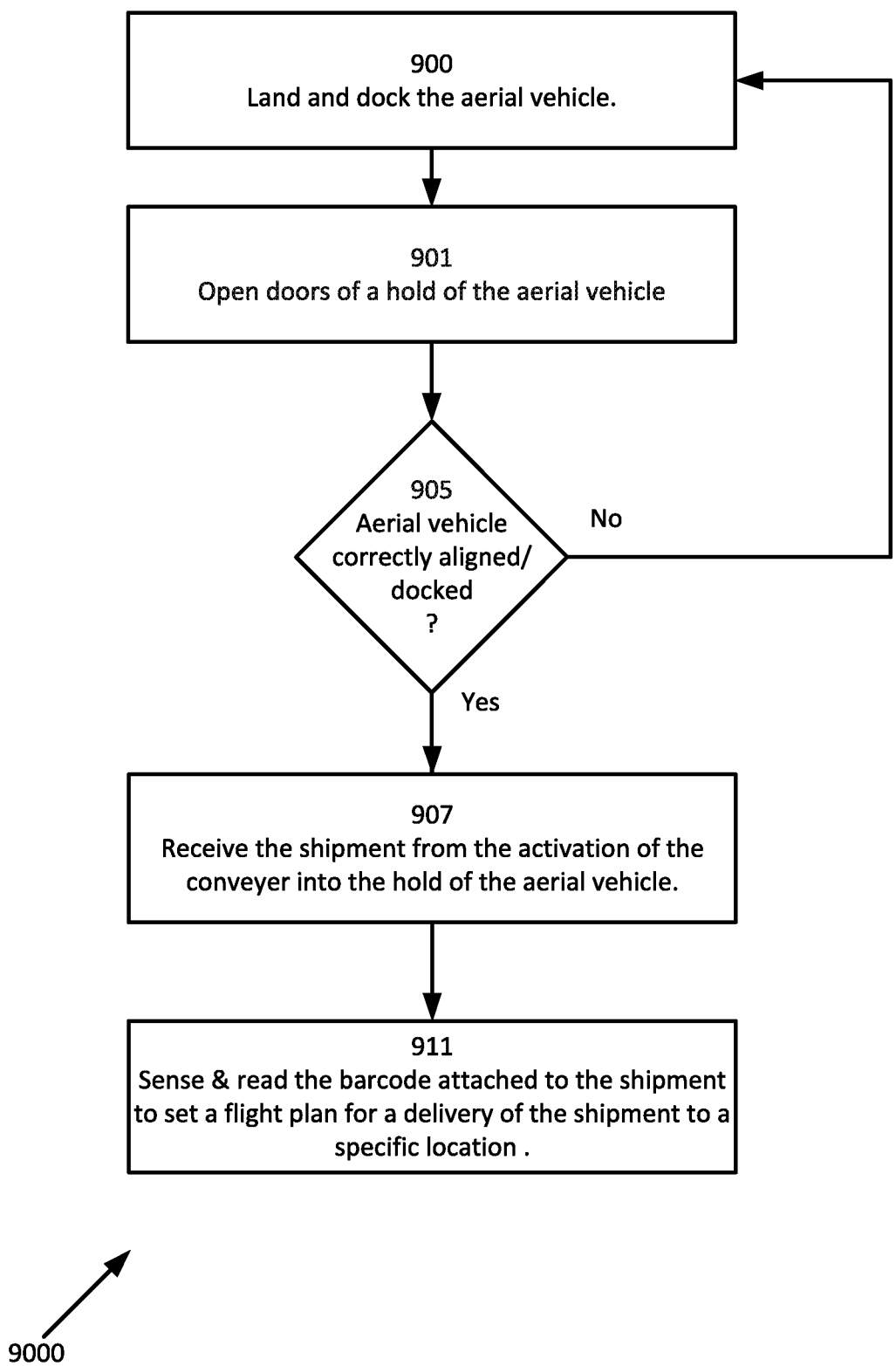
FIGS. 9A and 9B show a flowchart and a continuation flowchart respectively of a method for a delivery system, in accordance with some embodiments.
Figure 9B:
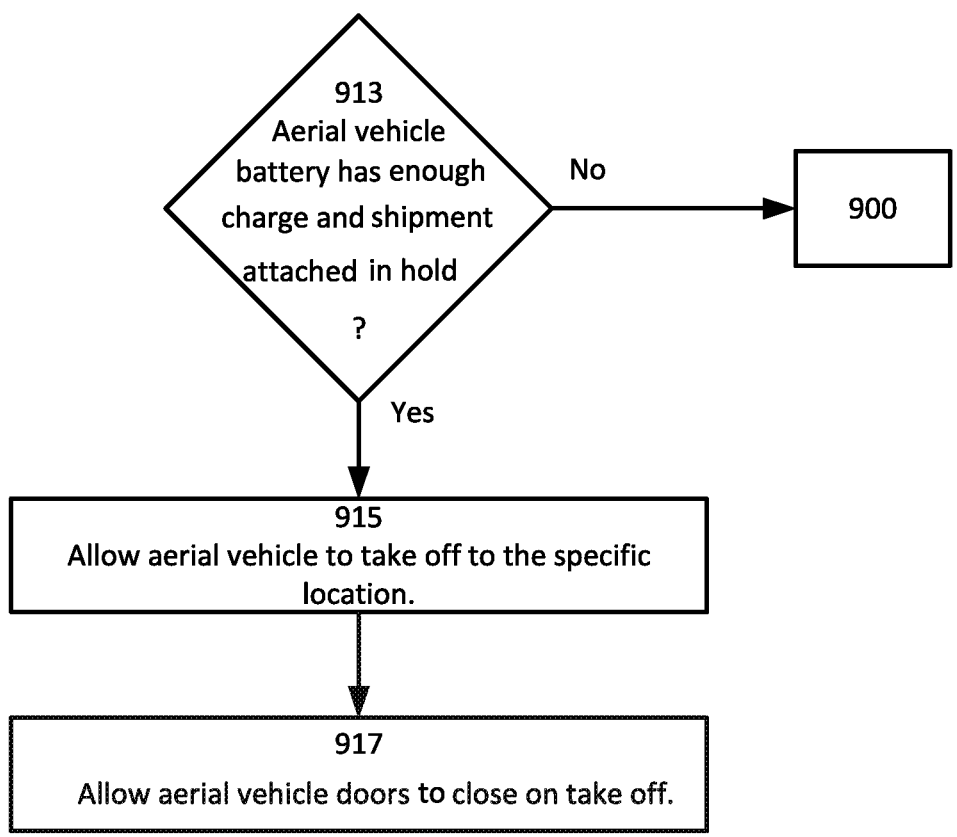

Reference is now made to FIG. 9A and FIG. 9B, which shows a flowchart and a continuation flowchart respectively of a method 9000 for delivery system 10, in accordance with some embodiments. At step 900, an aerial vehicle 18 with hold 19 arrives at landing platform 2, lands, and docks on footprint 21 between linear rails 26a and 26b. Landing and docking of vehicle 18 with hold 19 is usually performed when linear rails 26a and 26b are sent left and right away from each other in order to provide a maximum landing area for the aerial vehicle 18 onto platform 2.

At step 901, the landing vehicle 18 with hold 19 at step 900, the successful landing and docking, enables doors 19a of hold 19 to be opened by virtue of mechanism 14. Mechanism 14 by virtue of landing/docking between linear slider 26a and 26b enables doors 19a to be opened about pivot point Pv1 upon successful docking. Spring 14a of mechanism 14 is held less compressively and doors 19a are open by virtue of lever 13 being pushed up when hold 19 is docked between linear rails 26a and 26b and skids 16 in contact with the landing pad of platform 2. Conversely, when aerial vehicle 18 takes off from the landing pad platform 2 mechanism 14 is held more compressively enabling door a 19a to close on take off.

At decision step 905, if aerial vehicle with hold 19 is not properly docked, cameras 25 may be used to help in the docking process at step 900. The docking process under control of control unit 70 is to ensure the feature of pulley wheels P1 and P1' being independently rotatable of the rotation of pulley wheels P2 and P2'. The independent rotation of the pairs of pull wheels P1 and P1', enables an independent horizontal movement between linear rail 26a and 26b and the position of linear rails 26a and 26b themselves with respect to their alignment on the landing pad of platform 2 with channel CH2 where shipment 61/package 22 is stored. The independent horizontal distance being variable helps to accommodate different footprints 21 for different sizes of aerial vehicle 18 with respect to the horizontal distance required.

Further, at decision step 905, upon a successful landing and docking of aerial vehicle/hold 19 at step 900, enables DC power to be applied to terminals of hold 19 by a gripping of hold 19 between linear rail 26a and the two bus bars of rod 27 attached to linear rail 26b. The gripping charges the batteries of aerial vehicle 18 and hold 19 under control of battery charge controller 73. In a network of locations utilizing platforms 2 and the feature of charge controller 73/control unit 70 may allow for a longer distance delivery or for heavier shipments 61 to or from platform 2. Where in the network intermediate platforms 2 may serve the purpose of providing recharge to the batteries of aerial vehicle/hold 19 to complete the longer distance delivery and/or redirection of shipments 61.

At step 907, the movement of belt 31 and dividers 32 convey shipment 61 towards hold 19. Hook 28a under control of control unit 70 and electro-mechanical actuators 74, pushes shipment 61 towards ramp 19c between linear rails 26a and 26b for package 22 to be loaded into hold 19 of aerial vehicle 18 through one of four doors 19b with the aid of one of four respective ramps 19c. Ramps 19c are formed when aerial vehicle 18 lands and docks on platform 2. Each of the four flaps used for ramps 19c extend outward to form a ramp angle of approximately forty-five (45°) degrees upon a successful landing and docking of aerial vehicle 18 at decision step 905.

At step 911, sensors and/or a camera included in hold 19 and aerial vehicle 18 may confirm correct placement of shipment 61 in to hold 19 and scan the bar code attached to package 22. The scanning of the bar code may set a flight plan for a delivery of shipment 61 to a specific location based on the information of the bar code. The setting of the flight plan may be done before container sets off along rail 4 towards conveyor 3. The scanning of the bar code may also confirm an already established flight plan for shipment 61 to a specific location based on details of cloud/internet 76.

At step decision step 913, aerial vehicle 18/hold 19 batteries are checked to see they have enough charge and shipment 61 is attached and secured in hold 19. If aerial vehicle 18/hold 19 batteries have enough charge, shipment 61 is attached, and secured in hold 19, aerial vehicle 18 is allowed to takeoff from the landing pad of platform 2 to go to a specific location determined by the flight plan at step 915.

At step 917, doors 19a of hold 19 are closed upon takeoff by virtue of mechanism 14, since spring 14a is held more compressively enabling doors 19a to close. An additional safety feature of step 917 is to check that the doors 19a are closed after a second or so after takeoff and if doors 19a are not closed, aerial vehicle 18 lands back on the landing pad of platform 2.

Figure 10A:
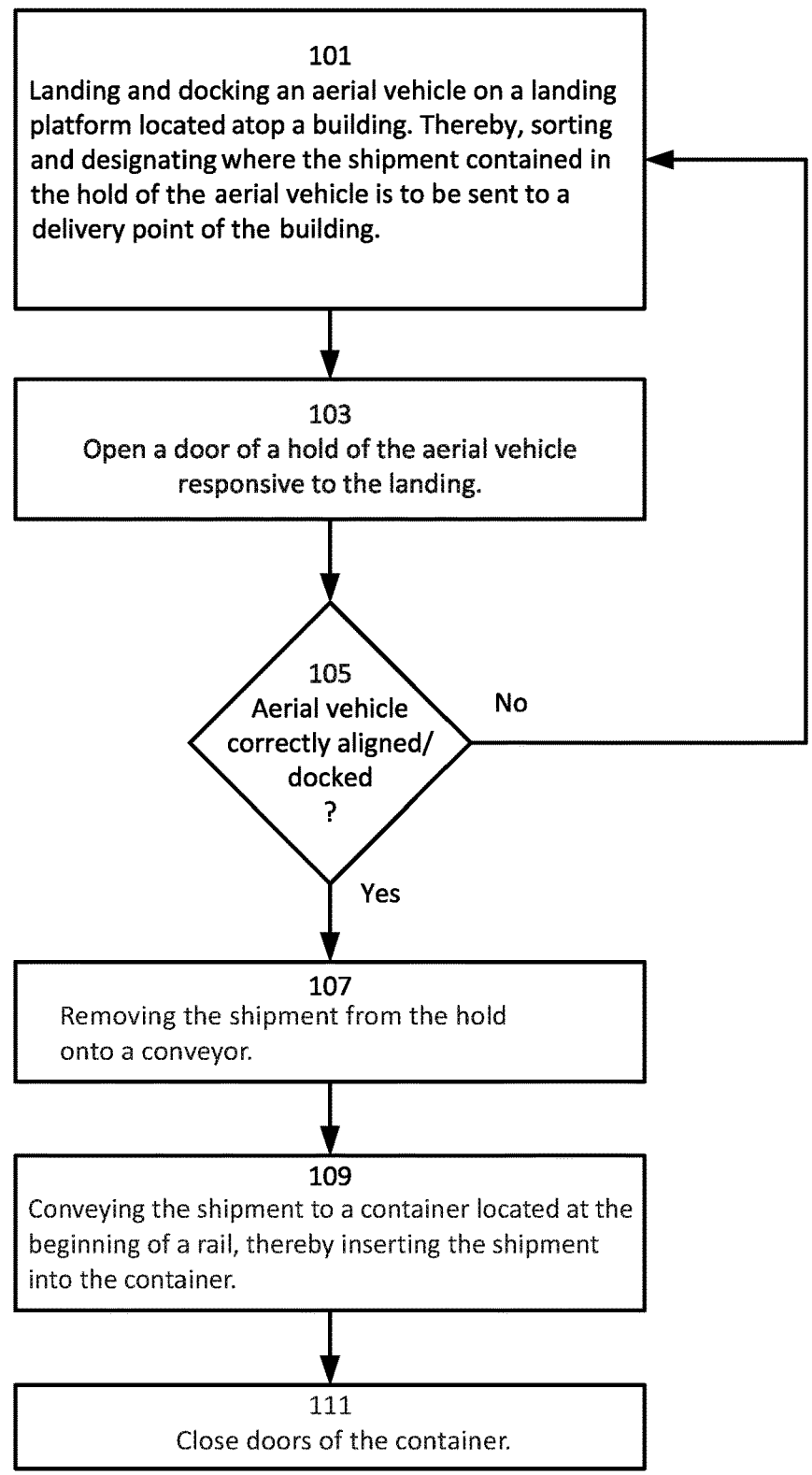
FIGS. 10A and 10B show a flowchart and a continuation flowchart respectively of a method for a delivery system, in accordance with some embodiments.
Figure 10B:
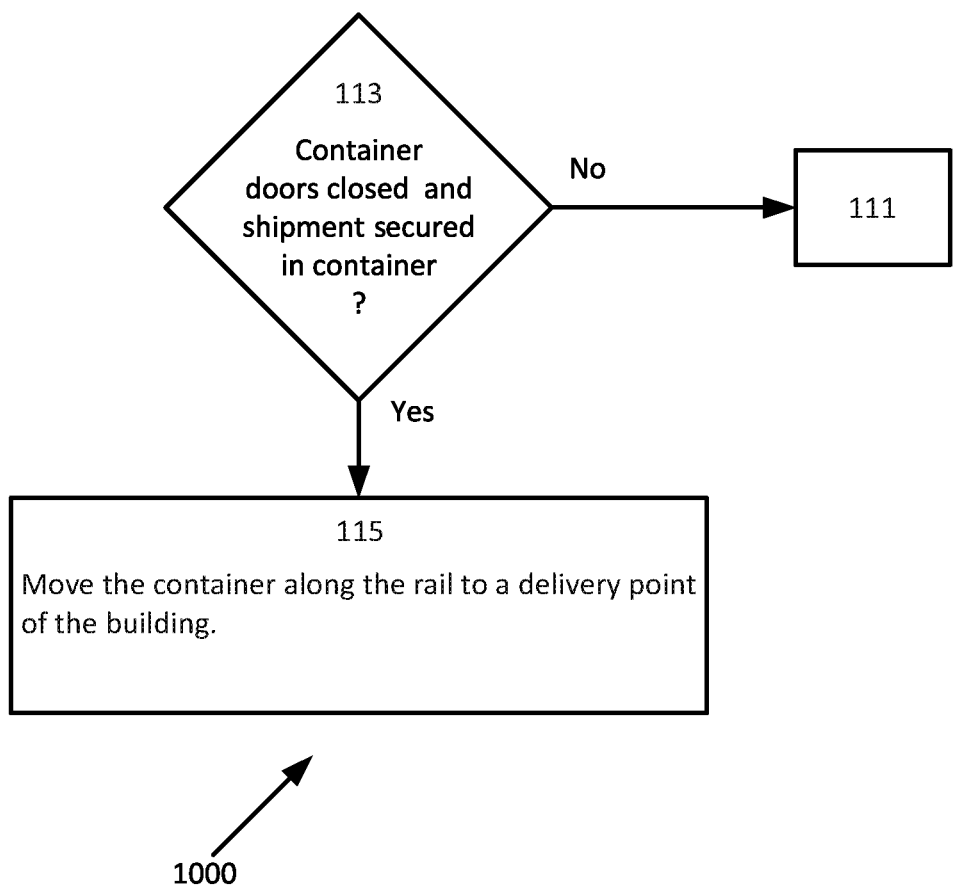

Reference is now made to FIG. 10A and FIG. 10B, which shows a flowchart and a continuation flowchart respectively of a method 1000 for delivery system 10, in accordance with some embodiments. At step 101, aerial vehicle 18 is to be landed on a footprint 21 between linear rails 26a and 26b so that shipment contained in hold 19 of the aerial vehicle 18 is to be sent to a correct delivery point of building 12. A tracking of shipment 61 may be by aerial vehicle 18 including a global positioning system (GPS) module connected wirelessly to cloud or internet 76 or local WiFi™ hotspots 78 at various locations on the delivery flight path of aerial vehicle 18.

When aerial vehicle 18 is close to a correct platform 2 where shipment 61 is to be delivered. Under control of control unit 70, the independent rotation of the pairs of pull wheels P1/P1' and P2/P2', enables separate movement of linear sliders 26a and 26b left or right across platform 2. The separate movement of linear sliders 26a and 26b, left or right responsive to the delivery information held by aerial vehicle 18 and/or cloud/internet 76 enables selection of the correct channel (CH1-CH4) of conveyer 3. Further, once linear sliders 26a and 26b are located and aligned at the correct delivery channel (CH1-CH4), linear sliders 26a and 26b may be moved further to adjust a horizontal distance between linear sliders 26a and 26b. The horizontal distance may be adjusted to accommodate different widths of footprints 21 for different sizes of aerial vehicle 18 with respect to the horizontal distance required.

At step 103, as a result of landing and docking step 101 of aerial vehicle 18 on platform 2, by virtue of landing/docking between linear slider 26a and 26b enables doors 19a to be opened about pivot point Pv1 upon successful docking. Spring 14a of mechanism 14 is held less compressively and doors 19a are open by virtue of lever 13 being pushed up when hold 19 is docked between linear rails 26a and 26b.

At decision 105, if aerial vehicle 18/hold 19 has correctly docked also in terms of alignment at the correct delivery channel (CH1-CH4) on the landing pad of platform 2. If aerial vehicle 18/hold 19 has not correctly docked in terms of alignment and at the correct delivery channel (CH1-CH4), a retry of landing step may be made at step 101.

At step 107, the successful landing/docking of aerial vehicle 18/hold at decision step 105, enables shipment 61 packed in package 22 to be pushed out through the open doors 19b of hold 19 by actuator 28, using hook 28b applied to package 22. Then by further use of hook 28b, the shipment is pushed onto a channel of conveyor 3 via ramp 19c. Motors (not shown) moveably connected to conveyor 3 are driven in a correct rotational direction to convey shipment 61 on belt 31 between two dividers 32 to enable an insertion of shipment 61 into container 5 at step 109.

At step 111, door 53 is closed by deactivation of lever 58 of the mechanism of container 5 to close door 53 and as container 5 begins to move away from locking mechanism 33 under control of control unit 70. The mechanism of container 5 may be similar to the door mechanism of hold 19 that opens doors 19a of hold 19.

At decision 113, it is confirmed if door 53 is closed and the correct shipment 61 is secured and attached to tray 56, by use of sensors and camera included in container 5, otherwise a repeat of step 111 is made. At step 115 under further control of control unit 70 applied to mechanism 40, shipment 61 is sent along rail 4 to a point of building 12. The point may be a window 12a or balcony and a person can remove tray 56 to receive shipment 61.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A package unloading and conveying system comprising:
    a landing platform;
    at least one container aligning linear rail, for aligning, on or above the landing platform, a hold of an aerial vehicle in front of one of a plurality of conveyor belts;
    at least one package extracting tool adapted to push or pull the package out of the aligned hold into a container aligned with one of the plurality of conveyor belts; and
    a plurality of rail arrangements each adapted to convey the container to one of a plurality of building windows from one of the plurality of conveyors.

2. The package unloading and conveying system of claim 1, wherein the container comprises:
    a handle attached to the container and a rail of the plurality of rail arrangements, the handle utilized to maintain the balance of the container on its way along the rail to the landing platform;
    a volume sensor, a transmitter and a rechargeable battery located inside the container, wherein at the bottom of the container includes two electrical terminals to supply DC power to the volume sensor, the transmitter and the rechargeable battery;
    a removable drawer including rails, wherein at a delivery location the drawer is pulled out to insert or remove a shipment packed in a package from container;
    a door configured to open as soon as the container has reached a point of proximity to the conveyor belt for an actuator to push a lever of a door mechanism of the container that opens the door; and a slider that attaches to the handle is moveably attached between a first wheel and a second wheel of the rail to enable movement of the container from a second end to a first end of the rail.

3. The package unloading and conveying system of claim 2, wherein a mechanism operatively attached to the rail comprises:

a first track and a second track that are round in cross section;

a cable connected to the container on one side and on the other side of the container an electric motor, wherein the electric motor includes a sensor configured to count the respective number of rotations of the electric motor to indicate where the container is at any given moment;

wherein the cable enters through a hollow portion of the first track and returns on a first wheel and a second wheel back to the fourth electric motor;

two springs are attached to the first and second tracks located at the second end, the two springs designed to stop the container from falling in the event of a failure of the cable; and two plastic guides located on the first or second track at the first end to prevent the container curling during loading and unloading of the shipment to and from a channel of a conveyer respectively.

4. A package loading and conveying system including:

a landing platform;

at least one package aligning linear rail, for aligning, on or above the landing platform, a hold of an aerial vehicle in front of one of a plurality of conveyor belts;

a package insertion tool adapted to push a delivery object to one of the plurality of conveyor belts into the aligned hold; and a plurality of rail arrangements operatively attached at first ends to the respective fronts of the plurality of conveyor belts, wherein each of the plurality of rail arrangements are adapted to convey a respective plurality of containers that contain a respective plurality of packages, to the backs of the plurality of conveyor belts or away from the backs of the plurality of conveyor belts to second ends of the plurality of rail arrangements.

5. The package loading and conveying system of claim 4, further comprising:

four cameras installed on a guardrail of the landing platform, wherein two of the four cameras are utilized for barcode scanning of a barcode attached to a package, two of the four cameras utilized to identify and control functional operations of the landing platform.

6. The package loading and conveying system of claim 4, further comprising:

a pair of electrical bus bars attached to the at least one package aligning linear rail, wherein a coming into contact with electrical terminals of the hold and the pair of electrical bus bars, enables an electrical charging of the batteries of the aerial vehicle.

7. The package loading and conveying system of claim 4, wherein the package insertion tool comprises:

an actuator attached to a hook;

wherein the hook is operably attached to the mechanism and engaged to a locking actuator, wherein the locking actuator moved back and forth along linear rail between two pulleys rotatably attached to a motor, enables both a loading or an unloading of a package onto or off the conveyor and, enables an insertion or removal of a package, to or from one container of the plurality of containers;

wherein a conveyer attached to a second end of a rail of the plurality of rail arrangements is driven by an electric motor that includes a sensor configured to count the revolutions of the electric motor that is rotatably attached to a belt of the conveyer that includes radially attached dividers; and a linear slider movably attached between the rail and a handle of the container, wherein the moveable attachment between the linear slider and the handle maintains the orientation of the container as the container travels back and forth on rail between the second end and the first end.

8. The package unloading and conveying system of claim 1, wherein the aerial vehicle comprises:

a hold having a plurality of doors each on a different edge of the hold;

a door tilting mechanism having a plurality of levers each of the plurality of levers is movable along a first direction along a perpendicular to the bottom of the hold when a distal end thereof is pressed against a landing platform;

wherein the door tilting mechanism having at least one spring adapted to pull each of the plurality of levers opposite to the first direction when a respective distal end is not pressed against the landing platform.

9. The package unloading and conveying system of claim 8, further comprising:

landing skids attached to the hold, wherein the landing skids are placed diagonally towards a footprint of platform to allow stable unloading and loading of the shipment packed in a package from and to a channel of a conveyer;

a volume sensor installed inside the hold;

four proximity sensors installed inside the container, the four proximity sensors utilized to confirm that the doors of the hold are closed;

four levers attached to the hold doors, the four levers configured so that upon landing of the aerial vehicle on footprint open the four doors;

at least four mechanisms including springs located on the door hinges of the four doors to ensure the closure of the four doors during takeoff of the aerial vehicle; and minus and plus electrical contacts for charging the aerial vehicle upon landing of the aerial vehicle on landing footprint; and four flaps each located on a different bottom edge of the hold, wherein each flap when pressed against the landing platform, provides four ramps to enable a loading and an unloading of a package to and from the hold respectively.

10. The package unloading and conveying system of claim 1, wherein the landing platform is attached atop a building, wherein the landing platform is operably connected to a first side of the conveyer;

wherein a first end of a rail of the plurality of rail arrangements is operably connected to a second side of the conveyer;

wherein a mechanism moveably attached to the rail at the first end and at a second end; and wherein the container is moveably attached to the mechanism, wherein the mechanism enables the container to move back and forth along the rail between the first end and the second end of the rail, wherein the second end is at a specific location on the exterior of the building.

11. The package unloading and conveying system of claim 10, wherein receiving a shipment packed in a package on the landing platform, the delivery system is configurable to:
convey the package by a channel of the conveyer to a first end of the rail, wherein an actuator and a hook is configurable to insert the package into the container and move the container to a second end of the rail,
wherein sending a package to the landing platform, the delivery system is configurable to:
receive an insertion of a shipment packed in a package into container located at the second end, and
move the container from the second end to the first end, wherein at the first end the actuator and a hook are configurable to remove the package from the container onto a channel of the conveyer to convey the package to the footprint.

12. A method for a delivery system to deliver a shipment packed in a package, the method comprising:
sticking a barcode sticker onto a package into which a shipment is packed in the package; packing the shipment into a container, wherein the container is moveably attached to a beginning of a rail that leads to a landing platform;
closing a door of the container;
scanning the bar code and sense inside the container to receive confirmation that the shipment is inside the container and the door is closed respectively;
moving with a mechanism, the container on the rail towards a conveyer, the conveyer operably attached to the landing platform;
removing the shipment from the container;
storing the shipment in the conveyer to await an arrival of an aerial vehicle;
upon arrival of the aerial vehicle, conveying the shipment on to a footprint of the landing platform;
after the conveying, returning the container back to the beginning of the rail.

13. The method of claim 12, further comprising:
upon a correctly aligned docking of the aerial vehicle on a footprint of the landing platform, opening the doors of the hold of the aerial vehicle, wherein the docking enables charging a battery of the aerial vehicle;
receiving the shipment from the conveyer into the hold of the aerial vehicle;
during the receiving, sensing with a camera of the aerial vehicle and reading thereby the bar code of the shipment in the hold, wherein the reading enables a flight controller of the aerial vehicle to set a flight plan for a delivery of the shipment to a specific location;
closing the doors of the hold;
confirming the doors are closed, the shipment is attached in the hold responsive to the sensing and the charging of the battery used to power the aerial is sufficient to get the shipment to the specific location; and
enabling the aerial vehicle to take off towards the specific location subject to the confirming.

14. The method of claim 13, wherein the docking enables recharging of the batteries that power the aerial vehicle.

15. A method for a delivery system to receive a shipment packed in a package, the method comprising:
landing and docking an aerial vehicle on a unique position of footprint of a landing platform mounted to a building according to sensed information of a barcode attached to the shipment, thereby sorting and designating where the shipment contained in the hold of the aerial vehicle is to be sent to a delivery point of the building;
opening a door of a hold of the aerial vehicle;
removing the shipment from the hold and inserting the shipment into a container responsive to the docking connecting the container to a conveyer operably attached to the landing platform;
closing the doors of the container;
confirming the doors of the container are closed and the shipment is in the container responsive to a sensing of the bar code and proper location and attachment of the shipment in the container; and
conveying the container on a rail operably attached to the conveyer, wherein a mechanism of the container, leads the container from the conveyer along the rail to the delivery point of the building.

16. The method of claim 15, wherein the docking enables recharging of the batteries that power the aerial vehicle.

* * * * *